United States Patent
Kawasaki et al.

(10) Patent No.: US 9,351,279 B2
(45) Date of Patent: May 24, 2016

(54) RADIO COMMUNICATION SYSTEM, RADIO COMMUNICATION APPARATUS, AND RADIO COMMUNICATION METHOD

(75) Inventors: Yoshihiro Kawasaki, Yokosuka (JP); Tetsuya Yano, Yokohama (JP); Yoshiaki Ohta, Yokohama (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 355 days.

(21) Appl. No.: 13/618,385

(22) Filed: Sep. 14, 2012

(65) Prior Publication Data

US 2013/0010732 A1 Jan. 10, 2013

Related U.S. Application Data

(63) Continuation of application No. PCT/JP2010/055936, filed on Mar. 31, 2010.

(51) Int. Cl.
*H04W 4/00* (2009.01)
*H04W 72/00* (2009.01)

(52) U.S. Cl.
CPC ..................... *H04W 72/00* (2013.01)

(58) Field of Classification Search
CPC ....................................................... H04L 72/00
USPC ......................................................... 370/329
See application file for complete search history.

(56) References Cited

U.S. PATENT DOCUMENTS

| | | | |
|---|---|---|---|
| 7,920,516 B2 | 4/2011 | Nishio et al. | |
| 8,559,384 B2 * | 10/2013 | Yamada et al. | 370/329 |
| 8,755,345 B2 * | 6/2014 | Xie | H04L 5/0053 370/328 |
| 2009/0316659 A1 * | 12/2009 | Lindoff et al. | 370/332 |
| 2010/0260124 A1 * | 10/2010 | Noshio et al. | 370/329 |
| 2011/0075624 A1 * | 3/2011 | Papasakellariou | H04L 5/0053 370/329 |
| 2011/0228724 A1 * | 9/2011 | Gaal | H04L 5/001 370/328 |

(Continued)

FOREIGN PATENT DOCUMENTS

| | | |
|---|---|---|
| EP | 2 207 270 A1 | 7/2010 |
| JP | 2010-541367 A | 12/2010 |

(Continued)

OTHER PUBLICATIONS

3GPP TS 36.213 V9.0.1 (Dec. 2009); 3rd Generation Partnership Project; Techincal Specification Group Radio Access Network; Evolved Universal Terrestrial Radio Access (E-UTRA); "Physical layer procedures (Release 9)"; Dec. 2009.

(Continued)

*Primary Examiner* — Guang Li
(74) *Attorney, Agent, or Firm* — Myers Wolin, LLC.

(57) ABSTRACT

A radio communication apparatus specifies a radio resource area in which a radio communication apparatus searches for a control signal, on the basis of information about the use of a plurality of frequency bands. Then, the radio communication apparatus transmits a control signal addressed to the radio communication apparatus in the specified radio resource area. The radio communication apparatus calculates the specified radio resource area on the basis of the information about the use of the plurality of frequency bands. Then, the radio communication apparatus searches signals in the calculated radio resource area, out of signals received from the radio communication apparatus, and thereby detects the control signal addressed to the radio communication apparatus.

19 Claims, 16 Drawing Sheets

(56) References Cited

U.S. PATENT DOCUMENTS

| | | | |
|---|---|---|---|
| 2011/0243066 A1* | 10/2011 | Nayeb Nazar | H04L 1/007 370/328 |
| 2012/0307759 A1 | 12/2012 | Miki | |
| 2014/0023021 A1 | 1/2014 | Nishio et al. | |

FOREIGN PATENT DOCUMENTS

| | | |
|---|---|---|
| JP | 2011-142599 A | 7/2011 |
| WO | 2009/041779 A1 | 4/2009 |
| WO | 2009/057283 | 5/2009 |
| WO | 2010/018684 A1 | 2/2010 |

OTHER PUBLICATIONS

Panasonic; "PDCCH with cross carrier operation"; Agenda Item: 7.1.3; 3GPP TSG-RAN WG1 Meeting #60; R1-101249; San Francisco, CA; Jan. 22-26, 2010.

Pantech & Curitel; "Considerations on issues of UE Component Carrier set"; Agenda Item: 7.2.1.1; 3GPP TSG RAN WG1 Meeting #59; R1-094676; Jeju, Korea; Nov. 9-13, 2009.

Samsung; "PDCCH monitoring set"; Agenda Item: 7.2.1.1; 3GPP TSG RAN WG1 Meeting #59; R1-094571; Jeju, Korea; Nov. 9-13, 2009.

International search report issued for corresponding International Patent Application No. PCT/JP2010/055936 mailed Jul. 6, 2010.

Notice of Final Rejection issued for corresponding Korean Application No. 10-2012-7025135 mailed on Sep. 26, 2014 with English translation.

Office Action issued for Japanese Patent Application No. 2014-015007 mailed on Sep. 30, 2014 with partial English translation.

ZTE, "PDCCH blind decoding and search space for carrier aggregation of LTE-A", Agenda Item 7.1.3, Feb. 22-26, 2010, 3GPP TSG-RAN WG1 Meeting #60, R1-100958, San Francisco, USA.

Office Action issued for corresponding Canadian Application No. 2,794,472, dated Jul. 30, 2014.

Office Action issued by the Canadian Intellectual Property Office for corresponding Canadian Application No. 2,794,472, dated Apr. 23, 2015.

Office Action issued for corresponding Japanese Patent Application No. 2012-507993 mailed on Jan. 13, 2015, with partial English translation.

Office Action issued for corresponding Chinese Patent Application No. 201080065684.3 dated Jan. 12, 2015 with an English translation.

ZTE, "PDCCH blind decoding and search space for carrier aggregation of LTE-A", Agenda Item: 7.1.3, Feb. 22-26, 2010, 3GPP TSG-RAN WG1 #60, R1-100958, San Francisco, CA (US).

Office Action issued for corresponding Japanese Application No. 2013-199652 mailed on Mar. 17, 2015. Partial English translation provided.

Panasonic, "Component carrier indication scheme for carrier aggregation", Agenda Item: 15.4, 3GPP TSG-RAN WG1 Meeting #58, R1-093465, Shenzhen, China, Aug. 24-28, 2009.

LG Electronics, "Construction of PDCCH search spaces for cross-carrier scheduling in carrier aggregation", 3GPP TSG RAN WG1 #60, R1-101347, San Francisco, CA (US), Feb. 22-26, 2010.

The extended European search report including the supplementary European search report and European search opinion issued for corresponding European Patent Application No. 10848952.7 dated Jun. 11, 2015.

\* cited by examiner

RADIO COMMUNICATION SYSTEM, RADIO COMMUNICATION APPARATUS, AND RADIO COMMUNICATION METHOD

CROSS-REFERENCE TO RELATED APPLICATION

This application is a continuation application of International Application PCT/JP2010/055936 filed on Mar. 31, 2010 and designated the U.S., the entire contents of which are herein wholly incorporated by reference.

FIELD

The present invention relates to a radio communication system, a radio communication apparatus, and a radio communication method.

BACKGROUND

Currently, radio communication systems such as cell phone systems and wireless metropolitan area networks (MANs) are widely used. Meanwhile, in the field of radio communications, lively discussions have been taking place about the next-generation communication technologies so as to increase the transmission speed and transmission capacity.

In radio communications, one radio communication apparatus may transmit a control signal to another radio communication apparatus. Information to be transmitted as a control signal includes information (e.g., information indicating a radio resource used for data transmission and a modulation coding scheme) which the other radio communication apparatus refers to so as to receive data transmitted by the radio communication apparatus. The information to be transmitted as a control signal also includes information (e.g., information indicating a radio resource to be used for data transmission and a specified modulation coding scheme) which the other radio communication apparatus refers to so as to transmit data to the radio communication apparatus.

In radio communication systems such as LTE (Long Term Evolution) system and LTE-A (LTE-Advanced system), for example, a radio resource area (search space) in which a radio communication apparatus at the receiving end monitors whether there is a control signal is defined in each radio subframe in the radio downlink. There are two types of search spaces: the common search space for control signals that are commonly referred to by a plurality of radio communication apparatuses, and the UE (User Equipment)-specific search space for control signals that are referred to by a particular radio communication apparatus. A radio communication apparatus at the transmitting end transmits a control signal using radio resources in the search space corresponding to the destination of the control signal. The radio communication apparatus at the receiving end monitors the common search space and the UE-specific search space corresponding to the radio communication apparatus at the receiving end, and thereby detects the control signal. Since such search spaces are defined, it is possible to limit the area to be monitored by each radio communication apparatus, and therefore to reduce the signal processing workload for detecting a control signal addressed to the radio communication apparatus.

For instance, in the LTE system, the location of the UE-specific search space may be adjusted in accordance with the identifier of the radio communication apparatus at the receiving end and the number of the subframe (a time unit for scheduling transmission of radio signals) (see, 3rd Generation Partnership Project, "Evolved Universal Terrestrial Radio Access (E-UTRA); Physical layer procedures", 3GPP TS 36.213 V9.0.1, 2009-12, Section 9.1.1, for example). In this case, each of the radio communication apparatuses at the transmitting end and the receiving end can calculate the location of the UE-specific search space on the basis of a predetermined algorithm. It is to be noted that, in radio communications, the amount of control signals to be transmitted is not always constant. Therefore, in order to use the radio resources effectively, a plurality of search spaces may be set to overlap one another.

Further, as for the LTE-A system, for example, radio communication using a plurality of frequency bands in parallel is under study. Each of a plurality of frequency bands is often referred to as a component carrier. A method of transmitting a control signal and data corresponding thereto in different frequency bands in the case where a plurality of frequency bands are used is also under study. This method of transmitting a control signal is often referred to as cross-carrier scheduling. With cross-carrier scheduling, it is possible to transmit control signals for a plurality of frequency bands in a single frequency band (see, 3rd Generation Partnership Project, "PDCCH monitoring set", R1-094571, 3GPP TSG RAN WG1 Meeting #59, 2009-11, and 3rd Generation Partnership Project, "Considerations on issues of UE Component Carrier set", R1-094676, 3GPP TSG RAN WG1 Meeting #59, 2009-11).

In the case where control signals are transmitted using a smaller number of frequency bands than the number of frequency bands to be used for data communication, the amount of control signals to be transmitted in a single search space is increased. Meanwhile, as mentioned above, there are overlaps between a plurality of search spaces. Therefore, depending on the usage of the other search spaces, the amount of the practically available radio resources may be reduced, which may result in failing to reserve a sufficient amount of radio resources corresponding to the amount of the control signals to be transmitted.

SUMMARY

According to an aspect of the embodiments, there is provided a radio communication system which includes: a first radio communication apparatus and a second radio communication apparatus that communicate by radio with each other using a plurality of frequency bands; wherein the first radio communication apparatus includes a control unit configured to specify a radio resource area in which the second radio communication apparatus searches for a control signal, on the basis of information about use of the plurality of frequency bands; and a transmitting unit configured to transmit a control signal addressed to the second radio communication apparatus, in the radio resource area specified by the control unit; and wherein the second radio communication apparatus includes a calculating unit configured to calculate the specified radio resource area, on the basis of the information about use of the plurality of frequency bands; and a detecting unit configured to search signals in the radio resource area calculated by the calculating unit, out of signals received from the first radio communication apparatus, so as to detect the control signal addressed to the second radio communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments will be described below with reference to the accompanying drawings.

First Embodiment

Figure 1:
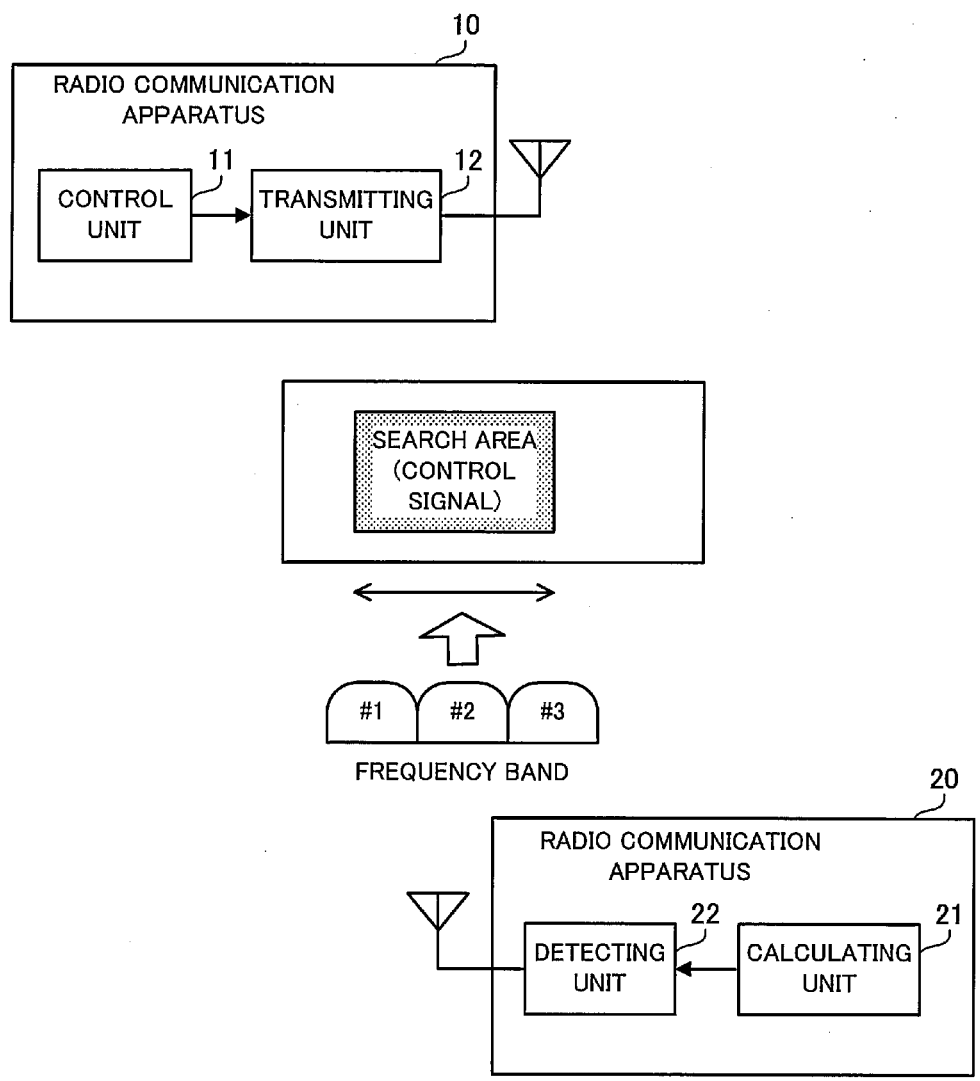
FIG. 1 illustrates a radio communication system according to a first embodiment.

FIG. 1 illustrates a radio communication system according to a first embodiment. The radio communication system according to the first embodiment includes radio communication apparatuses 10 and 20. For example, the radio communication apparatus 10 may be implemented as a base station or a relay station, and the radio communication apparatus 20 may be implemented as a mobile station. The radio communication apparatuses 10 and 20 communicate by radio with each other using a plurality of frequency bands. The radio communication apparatus transmits a control signal to the radio communication apparatus 20 in at least one of the plurality of frequency bands.

The radio communication apparatus 10 includes a control unit 11 and a transmitting unit 12. The control unit 11 specifies a radio resource area (a search area) in which the radio communication apparatus 20 searches for a control signal, on the basis of information about the use of the plurality of frequency bands. The transmitting unit 12 transmits a control signal addressed to the radio communication apparatus 20 in the search area specified by the control unit 11.

The information about the use of the plurality of frequency bands may include information indicating the number of frequency bands to be used for data communication by the radio communication apparatus 20. The control unit 11 changes the size or location of the search area on the basis of the number of frequency bands, for example. Further, the information about the use of the plurality of frequency bands may include information indicating the frequency band to which the search area is set. The control unit 11 changes the size or location of the search area depending on which frequency band the search area is set to, for example. The location and size of the search area may be determined by inputting numerical values, such as the number of frequency bands and the frequency band number, into a predetermined function, for example.

The control unit 11 may specify a search area by further referring to information about the timing of transmitting a control signal (e.g., the subframe number) and identification information of the radio communication apparatus 20, in addition to the information about the use of the plurality of frequency bands. In that case, for example, the location and size of the search area may be determined by inputting numerical values, such as the number of frequency bands, the frequency band number, and the identification number of the radio communication apparatus 20, into a predetermined hash function, for example.

The radio communication apparatus 20 includes a calculating unit 21 and a detecting unit 22. The calculating unit 21 calculates the search area to be used for transmission of a control signal addressed to the radio communication apparatus 20, on the basis of the information about the use of the plurality of frequency bands. The method used by the calculating unit 21 for calculating the search area corresponds to the method used by the control unit 11 for specifying the search area. The detecting unit 22 processes (e.g., blind decodes) signals in the search area calculated by the calculating unit 21, out of signals received from the radio communication apparatus 10, and thereby detects the control signal addressed to the radio communication apparatus 20.

The algorithm of determining the size and location of the search area may be fixed in advance. In that case, the control unit 11 and the calculating unit 21 may independently calculate the search area, in accordance with the predetermined algorithm. Further, the radio communication apparatus 10 and the radio communication apparatus 20 may select an algorithm for determining the size and location of the search area by performing signaling. In that case, an appropriate algorithm may be selected in accordance with the communication environment.

In the radio communication system of the first embodiment described above, the radio communication apparatus 10 specifies a search area in which the radio communication apparatus 20 searches for a control signal on the basis of the information about the use of the plurality of frequency bands. Then, the radio communication apparatus 10 transmits a control signal addressed to the radio communication apparatus 20 in the set search area. The radio communication apparatus 20 calculates the specified search area, on the basis of the information about the use of the plurality of frequency bands. Then, the radio communication apparatus 20 processes signals in the calculated search area, out of signals received from the radio communication apparatus 10, and thereby detects the control signal addressed to the radio communication apparatus 20.

Accordingly, it is possible to effectively reduce the amount of the overlapping radio resources between the search area of the radio communication apparatus 20 and another search area (e.g., a search area common to a plurality of radio communication apparatuses, or a search area of another radio communication apparatus). Therefore, even in the case where a plurality of frequency bands is used for performing communication and hence the amount of control signals to be sent is increased, it is possible to easily reserve radio resources to be used for transmission of control signals.

For example, as the number of the frequency bands to be used for data communication increases, the search area may be increased. Further, as the difference between the number of frequency bands to be used for data communication and the number of frequency bands to be used for transmission of control signals increases, the search area may be increased. With this method, it is possible to balance between an increased search workload on the radio communication apparatus 20 due to an increase of the search area and the ease of reservation of radio resources. Further, in the case of transmitting control signals using a plurality of frequency bands, the location of the search area may be changed in accordance with the frequency band. With this method, even if a sufficient amount of radio resources is not reserved in a frequency band, the chance of reserving a sufficient amount of radio resources in another frequency band is increased.

In second through fifth embodiments described below, it is assumed that the radio communication system of the first embodiment is implemented as an LTE-A mobile communication system. However, the radio communication system of the first embodiment may be implemented as a fixed radio communication apparatus or other types of mobile communication systems.

Second Embodiment

Figure 2:
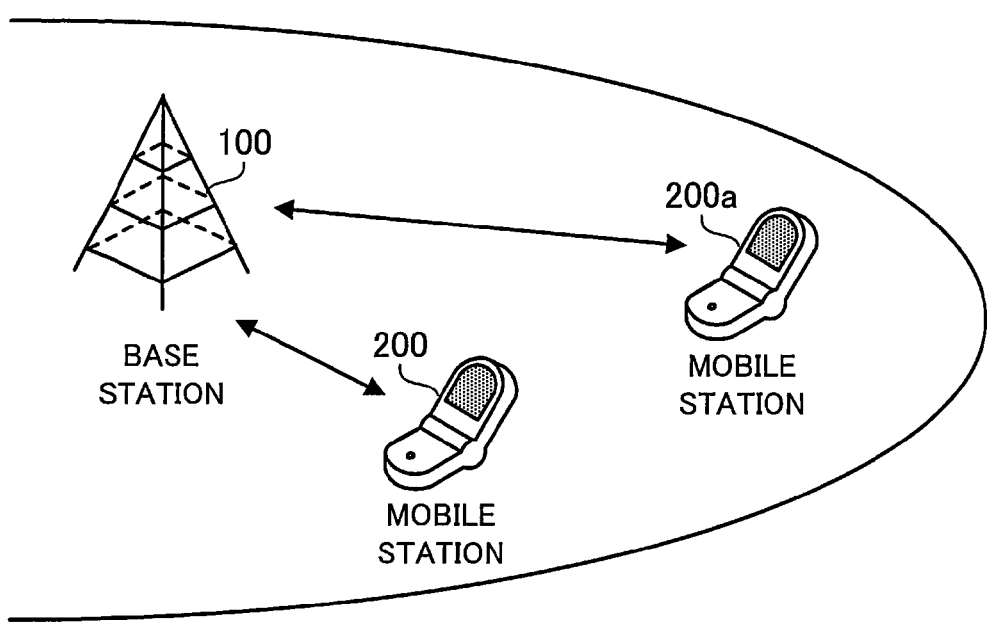
FIG. 2 illustrates a mobile communication system according to a second embodiment.

FIG. 2 illustrates a mobile communication system according to a second embodiment. The mobile communication system according to the second embodiment includes a base station 100 and mobile stations 200 and 200a.

The base station 100 is a radio communication apparatus that communicates by radio with the mobile stations 200 and 200a. The base station 100 is connected to an upper wired network (not illustrated) so as to transfer data between the upper network and the mobile stations 200 and 200a. As will be described below, the base station 100 uses a plurality of (e.g., five) frequency bands called component carriers (CCs: Component Carriers) so as to perform radio communication.

The mobile stations 200 and 200a are radio terminal apparatuses that perform radio communication by connecting to the base station 100. Examples of mobile stations 200 and 200a include cell phones and mobile information terminals. The mobile stations 200 and 200a receive data from the base station 100, and transmit data to the base station 100. A link in the direction from the base station 100 to the mobile stations 200 and 200a may be referred to as a downlink (DL), and a link in the direction from the mobile stations 200 and 200a to the base station 100 may be referred to as an uplink (UL). The mobile stations 200 and 200a use a part or all of the plurality of component carriers. Performing communication using two or more component carriers in parallel may be referred to as carrier aggregation.

It is to be noted that the base station 100 may be considered as an example of the radio communication apparatus 10 of the first embodiment, and the mobile stations 200 and 200a may be considered as an example of the radio communication apparatus 20 of the first embodiment. Further, in the second embodiment, it is assumed that the mobile stations 200 and 200a connect to a base station. However, the mobile stations 200 and 200a may connect to a relay station. In that case, transmission and reception of control signals (described below) are performed between the relay station and the mobile stations 200 and 200a.

Figure 3:
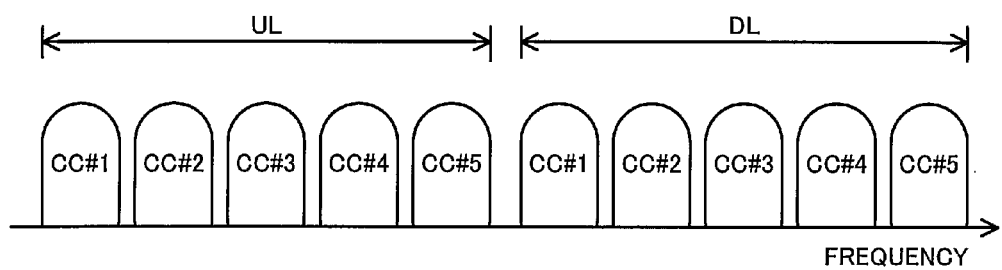
FIG. 3 illustrates an exemplary setting of component carriers.

FIG. 3 illustrates an exemplary setting of the component carriers. The base station 100 may use a maximum of five component carriers (the component carriers #1 through #5) so as to communicate with the mobile stations 200 and 200a.

In the case where Frequency Division Duplex (FDD) is used for two-way communication, the frequency bands of the component carriers #1 through #5 are reserved for each of the downlink and the uplink. When the term "component carrier" is used alone, the term may refer to a pair of a frequency band for the downlink and a frequency band for the uplink. In the case where Time Division Duplex (TDD) is used for two-way communication, five frequency bands are reserved regardless of whether the direction is downlink or uplink. FIG. 3 illustrates the case where FDD is used.

The base station 100 specifies the bandwidth of the respective component carriers #1 through #5 taking the number of mobile stations to be accommodated and the desired transmission speed into consideration. For example, the base station 100 selects one of the bandwidths of 1.4 MHz, 3 MHz, 5 MHz, 10 MHz, 15 MHz, and 20 MHz for each of the component carriers #1 through #5. The base station 100 may set all the component carriers to the same bandwidth, or may set the component carriers to different bandwidths. The base station 100 performs allocation of radio resources for each of the component carries #1 through #5.

Figure 4:
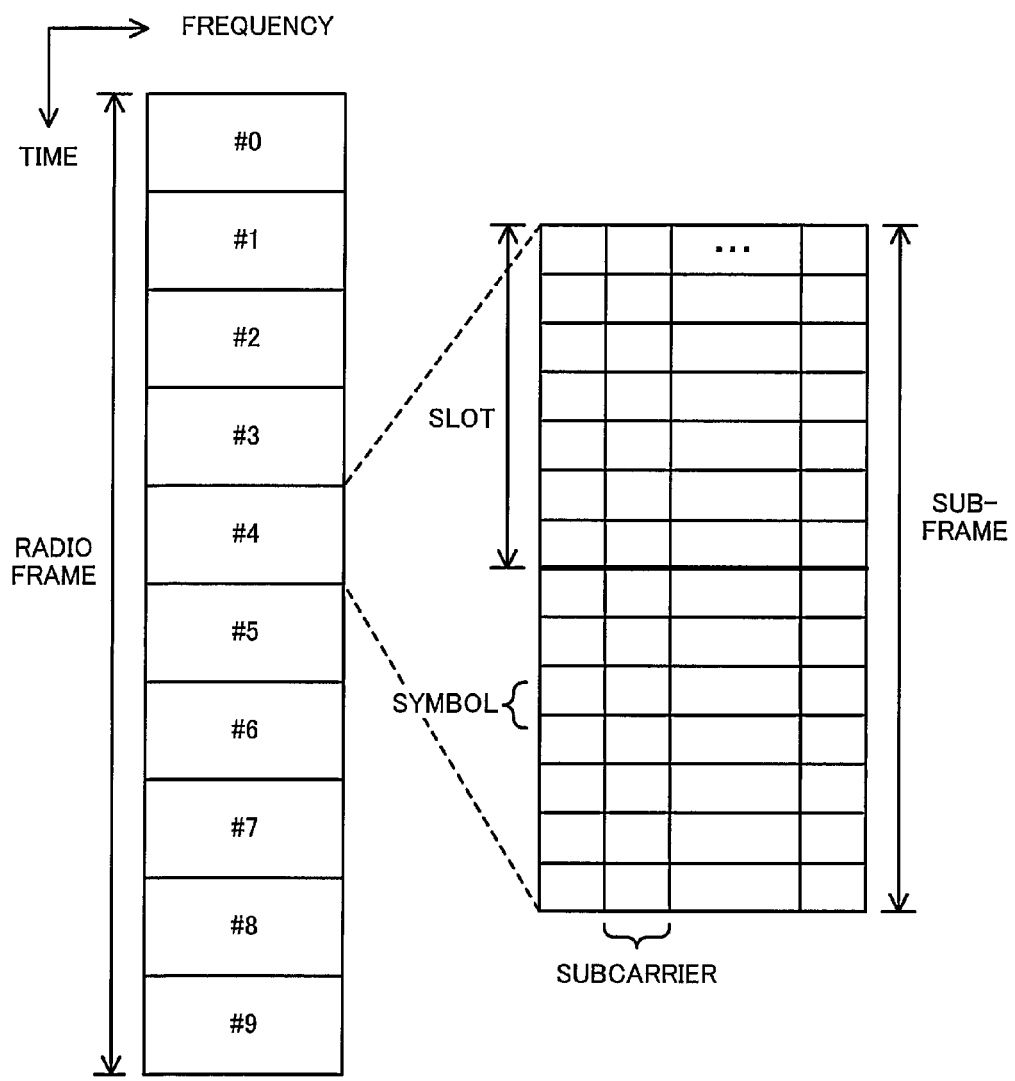
FIG. 4 illustrates an exemplary structure of a radio frame.

FIG. 4 illustrates an exemplary structure of a radio frame. On each of the component carriers #1 through #5, a radio frame as illustrated in FIG. 4 is transmitted between the base station 100 and the mobile stations 200 and 200a. One radio frame includes ten subframes (subframes #0 through #9).

The radio resources of the radio frame are divided into smaller units in the frequency direction and the time direction so as to be managed. In the time direction, each subframe includes two slots. Each slot includes seven (or six) symbols. The symbols may be OFDM (Orthogonal Frequency Division Multiple) symbols, for example. An interval signal called a CP (cyclic prefix) is added to the top of each symbol. In the frequency direction, the radio frame includes a plurality of subcarriers. The radio resources in the frequency-time domain are allocated to various channels. Allocation of the radio resources is controlled in units of subframes.

In the downlink subframe, a physical downlink control channel (PDCCH) in which the base station 100 transmits an L1 (Layer 1) control signal is transmitted. The radio resources within predetermined number of symbols (e.g., three symbols) from the top of each subframe are used for the PDCCH. Further, in the downlink subframe, a physical downlink shared channel (PDSCH) in which the base station 100 transmits a data signal and an L2/L3 (Layer 2/layer 3) control signal is located. In the uplink subframe, a physical uplink shared channel (PUSCH) in which the mobile stations 200 and 200a transmit a data signal is located.

As a multiple access scheme, OFDMA (Orthogonal Frequency Division Multiple Access) is used for the downlink radio frame, for example. On the other hand, SC-FDMA (Single-Carrier Frequency Division Multiple Access), N×SC-FDMA (N Times Single-Carrier Frequency Division Multiple Access), or the like is used for the uplink radio frame.

Figure 5:
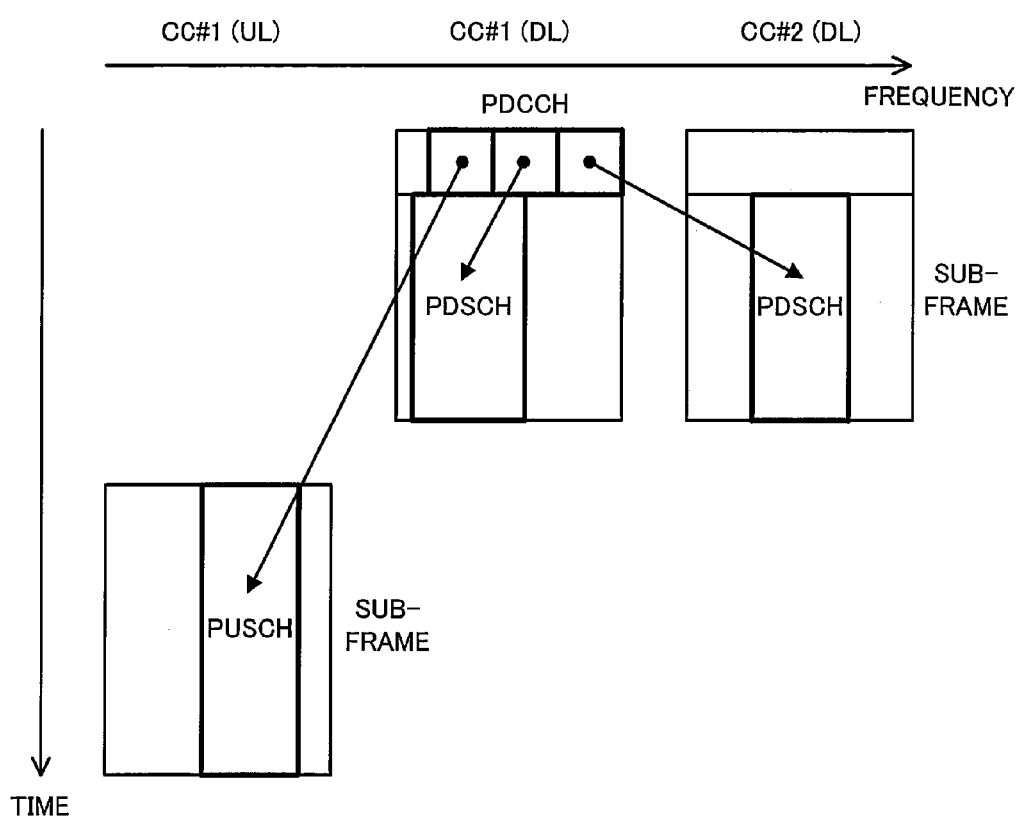
FIG. 5 illustrates an example of transmitting a PDCCH.

FIG. 5 illustrates an example of transmitting a PDCCH. It is assumed herein that a control signal addressed to the mobile station 200 is transmitted.

In this example, the mobile station 200 receives data from the base station 100 on the component carriers #1 and #2, and transmits data to the base station 100 on the component carrier #1. That is, the PDSCH of the mobile station 200 is located on each of the downlink component carriers #1 and #2, and the PUSCH of the mobile station 200 is located on the uplink component carrier #1. Further, the mobile station 200 receives a control signal from the base station 100 on the component carrier #1. That is, the PDCCH of the mobile station 200 is located in the downlink component carrier #1. The mobile station 200 monitors reception signals on the component carrier #1, and thereby detects a control signal to be referred to by the mobile station 200.

In this example, in a certain subframe on the component carrier #1, a control signal regarding a PDSCH located in the same subframe, and a control signal regarding a PDSCH located in a subframe on the component carrier #2 of the same timing are transmitted. Further, a control signal regarding a PUSCH located in a subframe after a predetermined time period (e.g., in the fourth frame following the certain subframe) on the component carrier #1 is transmitted. The mobile station 200 detects these three control signals addressed to the mobile station 200 from the certain subframe on the component carrier #1, and performs reception processing of the two PDSCHs and transmission processing of the single PUSCH.

In this way, on a certain component carrier, a control signal regarding a physical channel of another component carrier can be transmitted. That is, cross-carrier scheduling can be used in the mobile communication system of the second embodiment. It is to be noted that, as in the case of the mobile station 200, a PDSCH, a PUSCH, and a PDCCH may be located for the mobile station 200a. In that case, a group of one or more component carriers (a monitoring set) in which a PDCCH is located may be set independently for each of the mobile station 200 and the mobile station 200a. The PDCCHs of the mobile stations 200 and 200a may be present in the same component carrier.

Figure 6:
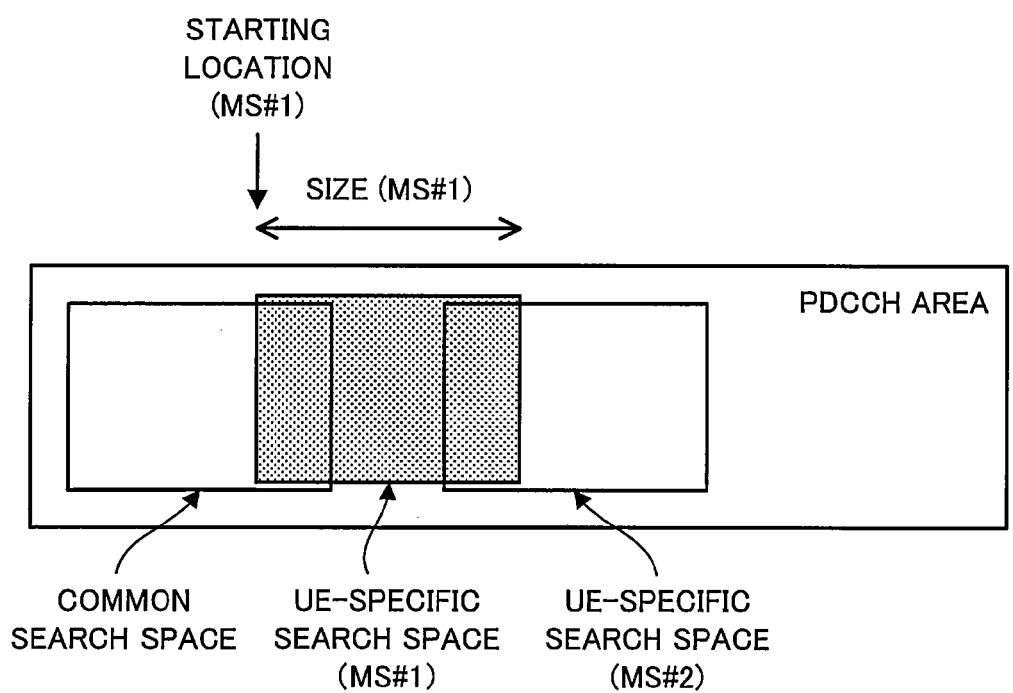
FIG. 6 illustrates an example of a transmission area of the PDCCH.

FIG. 6 illustrates an example of a transmission area of the PDCCH. In a radio resource area where a PDCCH could be located, a search space (corresponding to the search area described in the first embodiment) in which the mobile stations 200 and 200a search the PDCCHs is defined.

There are two types of search spaces: the common search space and the UE-specific search space. The common search space is used for transmitting control signals that are commonly referred to by all the mobile stations that connect to the base station 100, and control signals that are referred to by a plurality of mobile stations. The UE-specific search space is used for transmitting control signals that are referred to by a particular mobile station. The UE-specific search space is specified for each of the mobile stations. That is, each of the mobile stations 200 and 200a may monitor the radio resource area of the common search space and the UE-specific search space corresponding thereto.

The location and size of the common search space are fixed. On the other hand, the location and size of the UE-specific search spaces vary depending on identifiers of the mobile stations 200 and 200a assigned by the base station 100, the number of the subframes to which the search spaces belong, and the usage of the component carriers #1 through #5 of the mobile stations 200 and 200a. The base station 100 and the mobile station 200 and 200a use a common calculation formula so as to calculate the location and size of the UE-specific search spaces of the mobile stations 200 and 200a.

As illustrated in FIG. 6, a common search space and a plurality of UE-specific search spaces may overlap one another in the radio resource area in the frequency-time domain. This is because, since not all of the radio resources in the search space are always used, in the case where the search spaces are set so as not to overlap one another, the usage efficiency of the radio resources is reduced.

Radio resources in the overlapping area between a common search space and a UE-specific search space are preferentially used for the common search space. On the other hand, as for the radio resources in the overlapping area between UE-specific search spaces, it is not determined for which of the UE-specific search spaces the radio resources are preferentially used. The base station 100 controls allocation of the radio resources in the overlapping area in accordance with the amount of control signals to be transmitted to each of the mobile stations 200 and 200a. If the amount of control signals to be transmitted is large, the base station 100 may load the control signals into the free space of a limited size that is present in the search space by increasing the coding rate.

Figure 7:
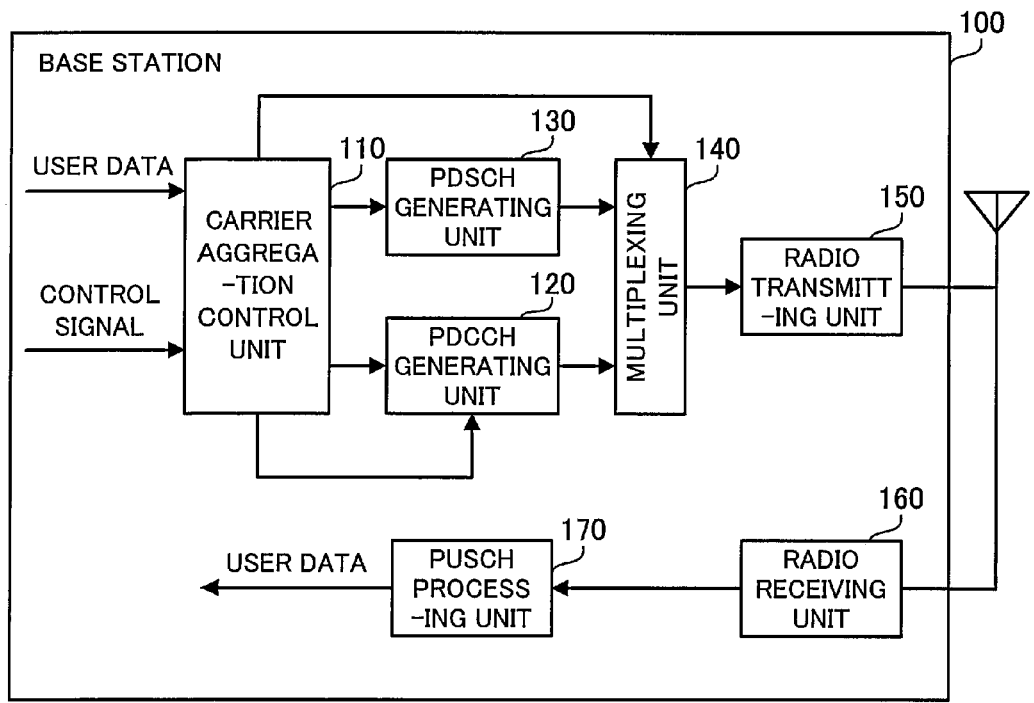
FIG. 7 is a block diagram of a base station.

FIG. 7 is a block diagram of the base station. The base station 100 includes a carrier aggregation control unit 110, a PDCCH generating unit 120, a PDSCH generating unit 130, a multiplexing unit 140, a radio transmitting unit 150, a radio receiving unit 160, and a PUSCH processing unit 170.

The carrier aggregation control unit 110 controls carrier aggregation. More specifically, the carrier aggregation control unit 110 distributes user data received from the upper network to a plurality of component carriers used by the mobile stations 200 and 200a. Then, the carrier aggregation control unit 110 outputs the user data to be transmitted on each component carrier to the PDSCH generating unit 130. Also, the carrier aggregation control unit 110 distributes control signals to one or more component carriers included in the monitoring set. Then, the carrier aggregation control unit 110 outputs the control signal to be transmitted on each component carrier to the PDCCH generating unit 120.

Further, the carrier aggregation control unit 110 determines the location and size of a UE-specific search space for each mobile station on the basis of the subframe number, an identifier (which may be referred to as an RNTI (Radio Network Temporary Identifier)) assigned to the mobile station, and the usage of the component carriers #1 through #5. Then, the carrier aggregation control unit 110 informs the multiplexing unit 140 of the starting location of the UE-specific search space, and informs the PDCCH generating unit 120 of the size.

The PDCCH generating unit 120 codes and modulates the control signal obtained from the carrier aggregation control unit 110 so as to generate a signal to be transmitted on the PDCCH, for each component carrier. As mentioned above, signals to be transmitted on the PDCCH include a signal regarding the PDSCH and a signal regarding the PUSCH. The PDCCH generating unit 120 adjusts the length of the PDCCH signal to be transmitted in the UE-specific search space in accordance with the size informed by the carrier aggregation control unit 110. Then, the PDCCH generating unit 120 outputs the generated PDCCH signal to the multiplexing unit 140.

The PDSCH generating unit 130 codes and modulates the user data obtained from the carrier aggregation control unit 110 so as to generate a signal to be transmitted on the PDSCH, for each component carrier. Then, the PDSCH generating unit 130 outputs the generated PDSCH signal to the multiplexing unit 140.

The multiplexing unit 140 maps the PDCCH signals obtained from the PDCCH generating unit 120 and the PDSCH signals obtained from the PDSCH generating unit 130 to the radio resources in the downlink subframe. In particular, the multiplexing unit 140 maps the PDCCH signals to the radio resources in the common search space and the UE-specific search spaces. Upon mapping the PDCCH signal to the UE-specific search space, the multiplexing unit 140 refers to the starting location of each UE-specific search space informed by the carrier aggregation control unit 110. The multiplexing unit 140 outputs generated transmission signals to the radio transmitting unit 150.

The radio transmitting unit 150 converts (up-converts) the transmission signals obtained from the multiplexing unit 140 into radio signals, and outputs the radio signals from the antenna. For conversion to radio signals, the radio transmitting unit 150 includes circuits such as a D/A (Digital to Analog) converter, a frequency converter, and a band pass filter (BPF), for example.

The radio receiving unit 160 converts (down-converts) radio signals received from the mobile stations 200 and 200a into baseband signals, and outputs the baseband signals to the PUSCH processing unit 170. For conversion to baseband signals, the radio receiving unit 160 includes circuits such as a low noise amplifier (LNA), a frequency converter, a band pass filter, and an A/D (Analog to Digital) converter, for example.

The PUSCH processing unit 170 demodulates and decodes the baseband signals obtained from the radio receiving unit 160. Thus, the user data and control information of the upper layer transmitted on the PUSCH by the mobile stations 200 and 200a are extracted. The extracted user data are transferred to the upper network. Part of the extracted control information is used for scheduling.

It is to be noted that the PDCCH generating unit 120, the PDSCH generating unit 130, and the PUSCH processing unit 170 may be provided for each of the component carriers #1 through #5 in order to perform signal processing for each of the component carriers #1 through #5.

Figure 8:
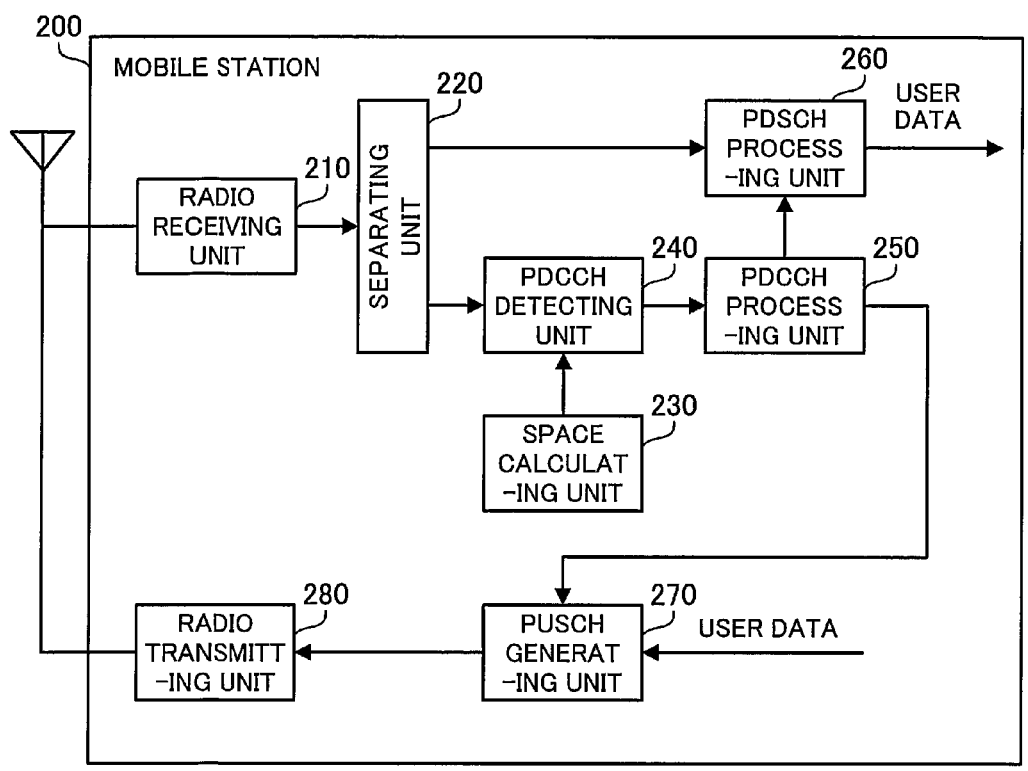
FIG. 8 is a block diagram of a mobile station.

FIG. 8 is a block diagram of the mobile station. The mobile station 200 includes a radio receiving unit 210, a separating unit 220, a space calculating unit 230, a PDCCH detecting unit 240, a PDCCH processing unit 250, a PDSCH processing unit 260, a PUSCH generating unit 270, and a radio transmitting unit 280. The mobile station 200a may be implemented with the same block configuration as that of the mobile station 200.

The radio receiving unit 210 down-converts radio signals received from the base station 100 into baseband signals, and outputs the baseband signals to the separating unit 220. For conversion to baseband signals, the radio receiving unit 210 includes circuits such as a low noise amplifier, a frequency converter, a band pass filter, and an A/D converter, for example.

The separating unit 220 extracts signals in the area where the PDCCH could be located and signals in the area where the PDSCH could be located, from the baseband signals for each component carrier. Then, the separating unit 220 outputs the extracted signals in the PDCCH area to the PDCCH detecting unit 240, and outputs the extracted signals in the PDSCH area to the PDSCH processing unit 260.

The space calculating unit 230 calculates the location and size of the UE-specific search space corresponding to the mobile station 200 on the basis of the subframe number, the identifier assigned to the mobile station 200, and the usage of the component carriers #1 through #5. The calculating method corresponds to the method used by the carrier aggregation control unit 110 for determining the location and size. Then, the space calculating unit 230 informs the PDCCH detecting unit 240 of the starting location and size of the UE-specific search space.

The PDCCH detecting unit 240 extracts signals in the common search space from the signals obtained from the separating unit 220 for each of the component carriers included in the monitoring set. Further, the PDCCH detecting unit 240 extracts, from the obtained signals, signals in the area (the UE-specific search space of the mobile station 200) that is identified by the starting location and size informed by the space calculating unit 230. Then, the PDCCH detecting unit outputs the extracted signals in the common search space and the UE-specific search space to the PDCCH processing unit 250.

The PDCCH processing unit 250 searches the signals obtained from the PDCCH detecting unit 240, and thereby extracts control signals to be referred to by the mobile station 200, for each of the component carriers included in the monitoring set. For example, the PDCCH processing unit 250 blind decodes the obtained signals. Then, the PDCCH processing unit 250 outputs a control signal regarding the PDSCH to the PDSCH processing unit 260, and outputs a control signal regarding the PUSCH to the PUSCH generating unit 270.

The PDSCH processing unit 260 obtains the control signal regarding the PDSCH from the PDCCH processing unit 250. Information indicated by the control signal includes information on the radio resource in which the PDSCH is located and information on the data format, for example. The PDSCH processing unit 260 refers to the control signal so as to extract a PDSCH signal from the signals obtained from the separating unit 220 and to demodulate and decode the PDSCH signal, for each component carrier to be used for data communication. Thus, the user data addressed to the mobile station 200 is obtained.

The PUSCH processing unit 270 obtains the control signal regarding the PUSCH from the PDCCH processing unit 250. Information indicated by the control signal includes information on the radio resource in which the PUSCH is located and information that specifies the data format to be used, for example. The PUSCH generating unit 270 refers to the control signal so as to code and modulate the user data and the control information of the upper layer to be transmitted to the base station 100, for each component carrier to be used for data communication. Then, the PUSCH generating unit 270 outputs generated transmission signals to the radio transmitting unit 280. It is to be noted that the subframe to which the PUSCH is mapped is a predetermined nth subframe (e.g., a fourth subframe) following the subframe in which the control signal regarding the PUSCH is received.

The radio transmitting unit 280 up-converts the transmission signals obtained from the PUSCH generating unit 270 into radio signals, and outputs the radio signals from the antenna. For conversion to radio signals, the radio transmitting unit 280 includes circuits such as a D/A converter, a frequency converter, and a band pass filter, for example.

It is to be noted that the PDCCH detecting unit 240, the PDCCH processing unit 250, the PDSCH processing unit 260, and the PUSCH generating unit 270 may be provided for each of the component carriers #1 through #5 in order to perform signal processing for each of the component carriers #1 through #5.

Figure 9:
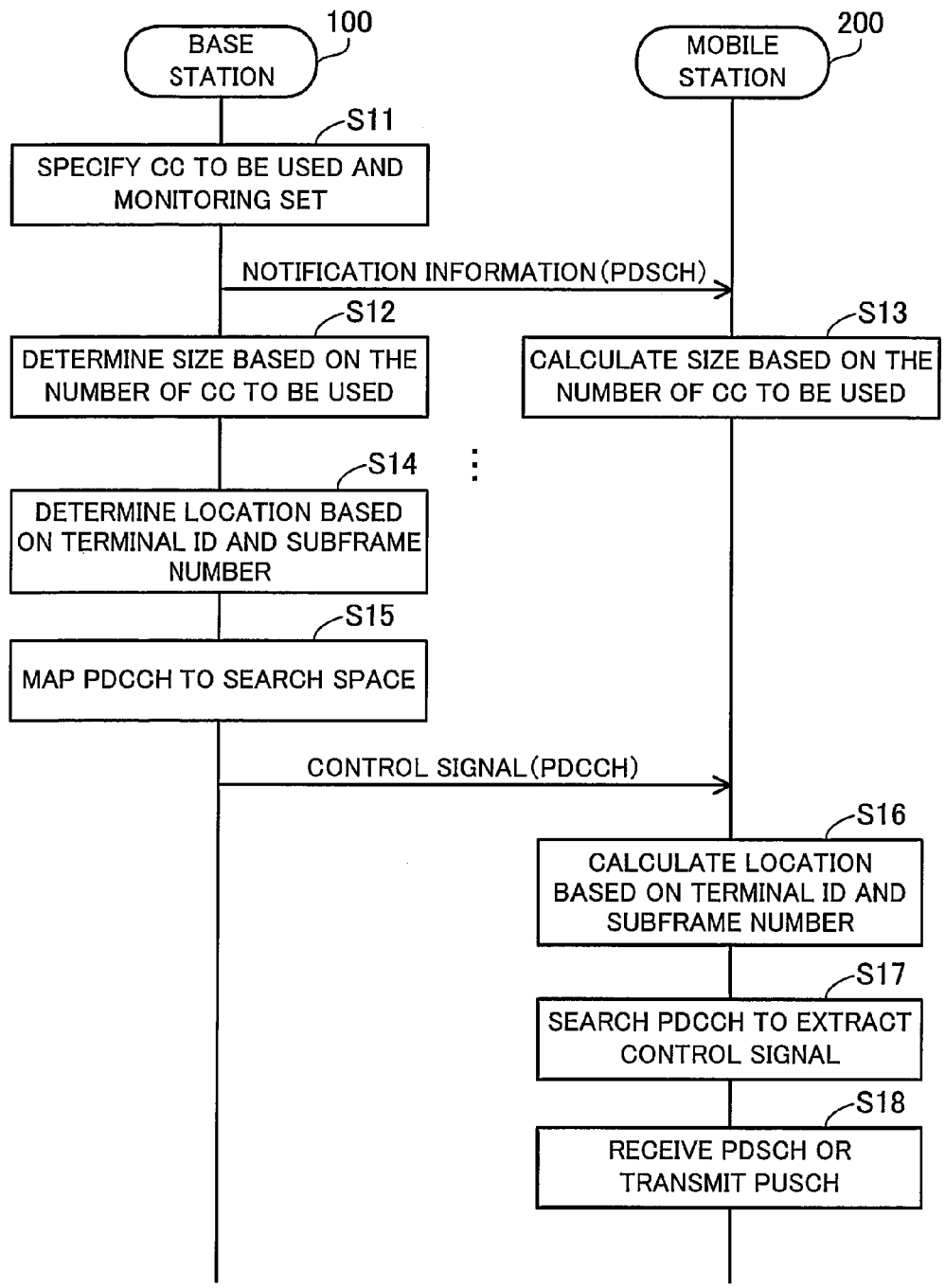
FIG. 9 is a flowchart illustrating transmission and reception of a PDCCH according to the second embodiment.

FIG. 9 is a flowchart illustrating transmission and reception of a PDCCH according to a second embodiment. In this flowchart, communication between the base station 100 and the mobile station 200 is illustrated. Communication between the base station 100 and the mobile station 200a may be performed in the same manner. The operations illustrated in FIG. 9 will be described in order of step number.

(Step S11) The base station 100 specifies component carriers that might be used for communication by the mobile station 200 (i.e., component carriers on which the PDSCH or the PUSCH is located). In each downlink subframe, all or a part of the specified component carriers are used. Further, the base station 100 specifies a monitoring set of the mobile station 200. The base station 100 selects component carriers to be included in the monitoring set in accordance with the volume of communication data and the communication quality of each component carrier, for example. The base station 100 informs the mobile station 200 of the component carriers to be used and the monitoring set on the PDSCH.

(Step S12) The base station 100 determines the size of a UE-specific search space of the mobile station 200 on the basis of the number of component carriers to be used for communication by the mobile station 200. The size is determined such that as the number of component carriers to be used increases, the size of the UE-specific search space increases. The number of component carriers that are used may be the number of downlink component carriers. Alternatively, the number of uplink component carriers or the sum of the number of downlink component carriers and the number of uplink component carriers may be used.

(Step S13) Similarly to the base station 100, the mobile station 200 calculates the size of the UE-specific search space of the mobile station 200 on the basis of the number of component carriers to be used. The calculation formula of the size is commonly specified in advance for the base station 100 and the mobile station 200.

(Step S14) The base station 100 determines the starting location of the UE-specific search space on the basis of the identifier of the mobile station 200 and the number of the subframe for transmitting a PDCCH signal. For example, the size may be calculated by applying a hash function to the identifier and the subframe number.

(Step S15) The base station 100 specifies a radio resource area that is identified by the size determined in Step S12 and the starting location determined in Step S14 as a UE-specific search space of the mobile station 200, for each of the component carriers belonging to the monitoring set specified in Step S11. The base station 100 maps a PDCCH signal addressed to the mobile station 200 to the specified UE-specific search space and transmits the PDCCH signal.

(Step S16) The mobile station 200 calculates the starting location of the UE-specific search space of the mobile station 200 on the basis of the identifier of the mobile station 200 and the number of the currently-receiving subframe. The calculation formula of the starting location is commonly specified in advance for the base station 100 and the mobile station 200.

(Step S17) The mobile station 200 extracts signals in the radio resource area that is identified by the size calculated in Step S13 and the starting location calculated in Step S16, for each of the component carriers belonging to the monitoring set. Then, the mobile station 200 searches (e.g., blind decodes) the PDCCH out of the extracted signals in the radio resource area so as to extract the control signal addressed to the mobile station 200.

(Step S18) The mobile station 200 performs reception processing of the PDSCH or transmission processing of the PUSCH using the control signal extracted in Step S17.

It is to be noted that, once the above Steps S11 through S13 are performed, these steps do not need to be performed again as long as no change is made to the component carriers that might be used by the mobile station 200 or to the monitoring set. However, the number of component carriers that are actually used in each subframe varies up to the value specified in Step S11. The Steps S14 through S18 are repeatedly performed while the base station 100 and the mobile station 200 communicate with each other.

Figure 10:
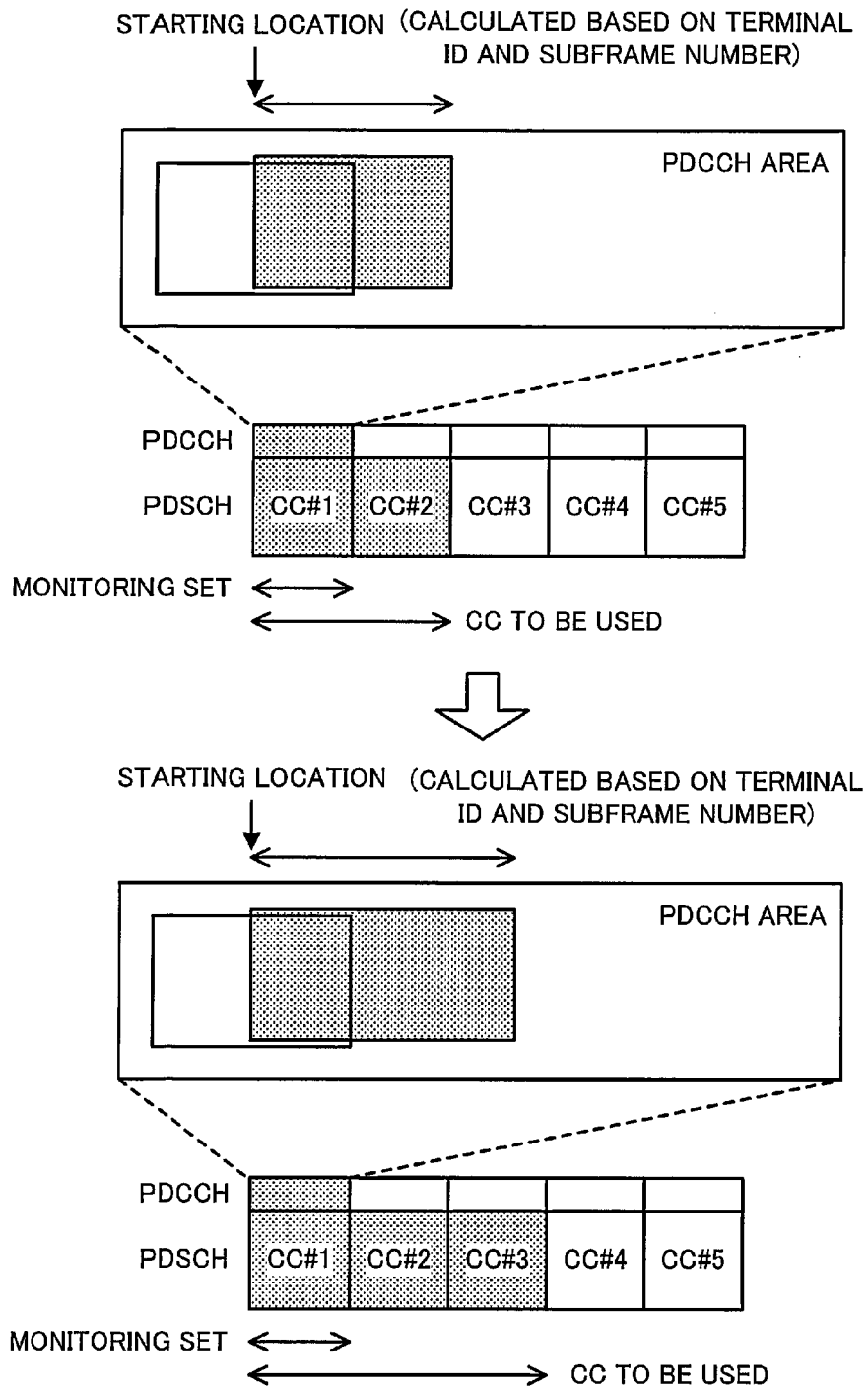
FIG. 10 illustrates an exemplary setting of a search space according to the second embodiment.

FIG. 10 illustrates an exemplary setting of a search space according to the second embodiment. In the example illustrated in the upper part of FIG. 10, the component carrier #1 is used for transmission of control signals addressed to the mobile station 200, and the component carriers #1 and #2 are used for transmission of data addressed to the mobile station 200. In this case, the size of the UE-specific search space of the mobile station 200 corresponds to the number of component carries to be used, which is "2".

On the other hand, in the example illustrated in the lower part, the component carriers to be used for transmission of data addressed to the mobile station 200 are changed to the component carriers #1 through #3. In this case, the size of the UE-specific search space of the mobile station 200 corresponds to the number of component carries to be used, which is "3". That is, the size of the UE-specific search space is increased compared to the case where the number of component carries to be used is "2". Thus, the area that might not overlap the common search space and other UE-specific search spaces is increased, and therefore the amount of the practically available radio resources may be increased.

According to the mobile communication system of the second embodiment described above, it is possible to specify a UE-specific search space with a size corresponding to the number of component carriers to be used for data communication. That is, in the case where the amount of control signals to be transmitted in a single UE-specific search space is likely to be increased, the size of the UE-specific search space can be expanded. This makes it possible to balance between an increased search workload on the mobile stations 200 and 200a due to an increase of the search area and the ease of reservation of radio resources, and thus to effectively transmit the control signals.

It is to be noted that the method of adjusting the size of a UE-specific search space may be applied to a part of mobile stations. In that case, the size of the UE-specific search spaces of the other mobile stations may be fixed.

Third Embodiment

Next, a description will be given of a third embodiment. The following mainly describes the differences from the second embodiment, and a description of the same features as those of the second embodiment will be omitted. A mobile communication system according to the third embodiment is different from that of the second embodiment in the method of determining the size of a UE-specific search space.

The mobile communication system of the third embodiment may be implemented with the same system configuration as that of the second embodiment illustrated in FIG. 2. Also, a base station and a mobile station of the third embodiment may be implemented with the same block configurations as those of the second embodiment illustrated in FIGS. 7 and 8, respectively. However, the method used by the carrier aggregation control unit 110 for setting the size and the method used by the space calculating unit 230 for calculating the size are different from those of the second embodiment. In the following, the third embodiment will be described using the same reference numbers as those used in FIGS. 7 and 8.

Figure 11:
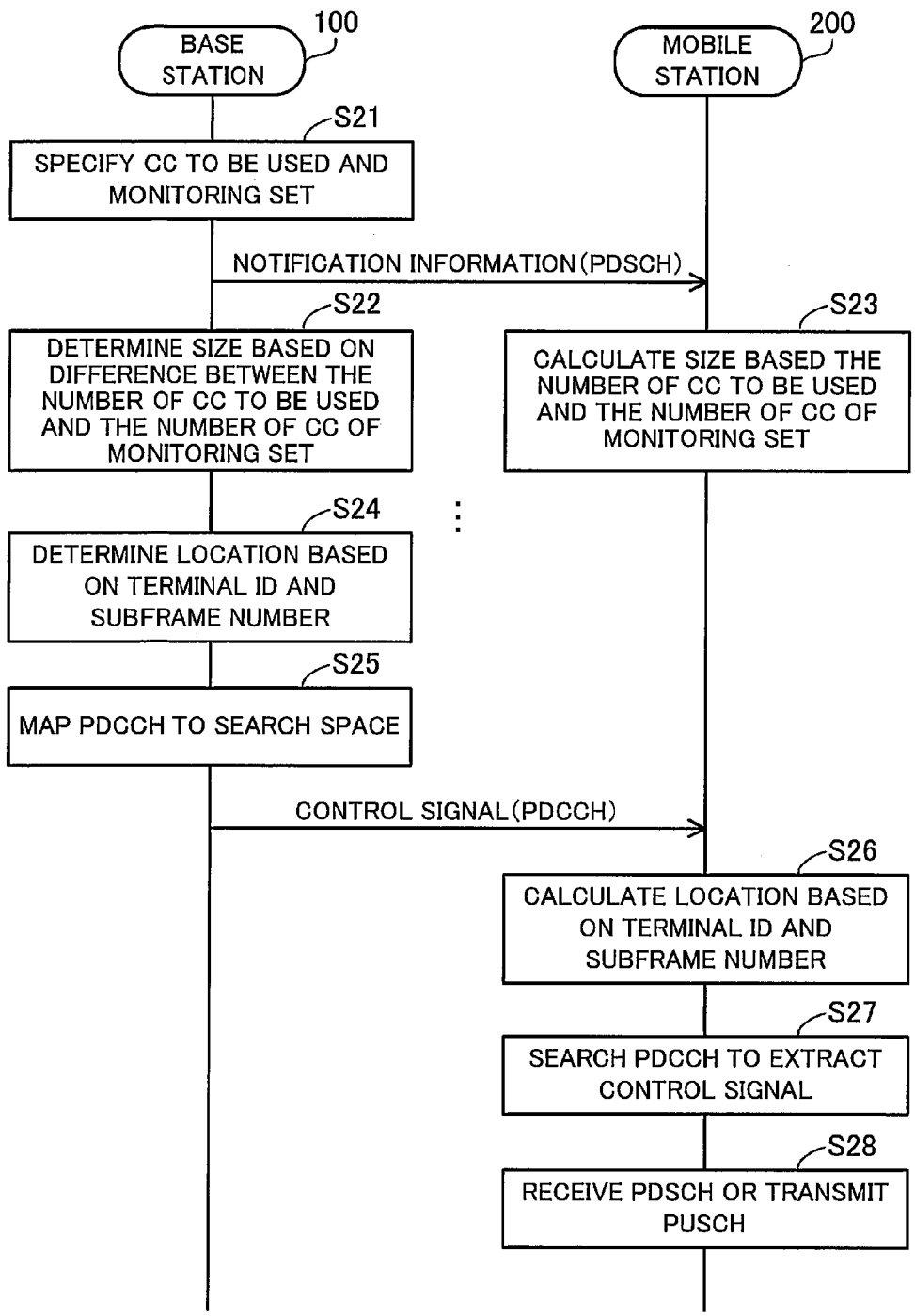
FIG. 11 is a flowchart illustrating transmission and reception of a PDCCH according to a third embodiment.

FIG. 11 is a flowchart illustrating transmission and reception of a PDCCH according to the third embodiment. The operations illustrated in FIG. 11 will be described in order of step number.

(Step S21) The base station 100 specifies component carriers that might be used for communication by the mobile station 200. Further, the base station 100 specifies a monitoring set of the mobile station 200. The base station 100 informs the mobile station 200 of the component carriers to be used and the monitoring set on the PDSCH.

(Step S22) The base station 100 determines the size of a UE-specific search space of the mobile station 200 on the basis of the difference between the number of component carriers to be used for communication by the mobile station 200 and the number of component carriers included in the monitoring set of the mobile station 200. The size is determined such that as the difference increases, the size of the UE-specific search space increases.

(Step S23) Similarly to the base station 100, the mobile station 200 calculates the size of the UE-specific search space of the mobile station 200 on the basis of the difference between the number of component carriers to be used and the number of component carries included in the monitoring set.

(Step S24) The base station 100 determines the starting location of the UE-specific search space on the basis of the identifier of the mobile station 200 and the number of the subframe for transmitting a PDCCH signal.

(Step S25) The base station 100 specifies a radio resource area that is identified by the size determined in Step S22 and the starting location determined in Step S24 as a UE-specific search space of the mobile station 200, for each of the component carriers belonging to the monitoring set specified in Step S21. The base station 100 maps a PDCCH signal addressed to the mobile station 200 to the specified UE-specific search space and transmits the PDCCH signal.

(Step S26) The mobile station 200 calculates the starting location of the UE-specific search space of the mobile station 200 on the basis of the identifier of the mobile station 200 and the number of the currently-receiving subframe.

(Step S27) The mobile station 200 extracts signals in the radio resource area that is identified by the size calculated in Step S23 and the starting location calculated in Step S26, for each of the component carriers belonging to the monitoring set. Then, the mobile station 200 searches (blind decodes) the PDCCH out of the extracted signals in the radio resource area so as to extract the control signal addressed to the mobile station 200.

(Step S28) The mobile station 200 performs reception processing of the PDSCH or transmission processing of the PUSCH using the control signal extracted in Step S27.

Figure 12:
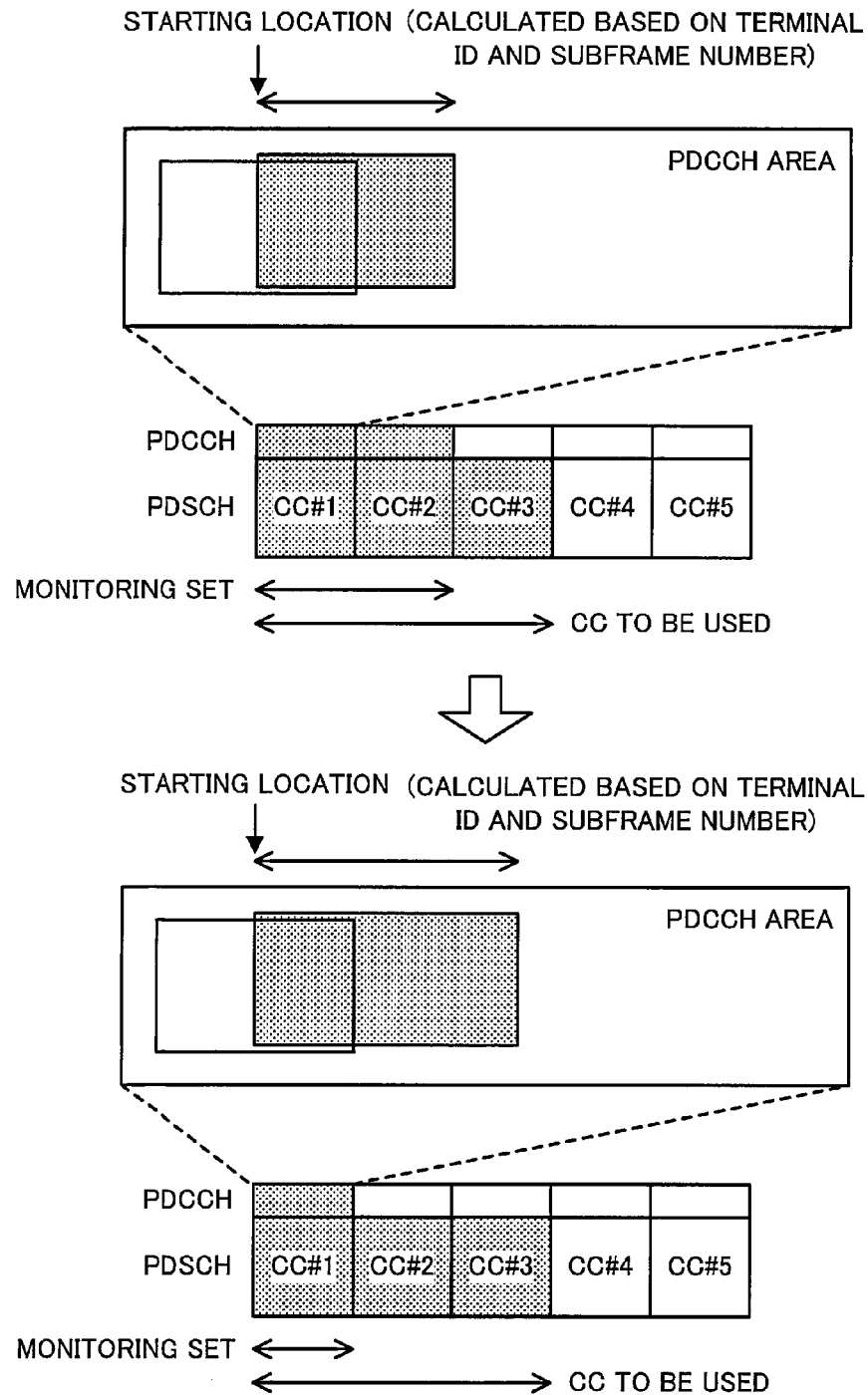
FIG. 12 illustrates an exemplary setting of a search space according to the third embodiment.

FIG. 12 illustrates an exemplary setting of a search space according to the third embodiment. In the example illustrated in the upper part of FIG. 12, the component carriers #1 and #2 are used for transmission of control signals addressed to the mobile station 200, and the component carriers #1 through #3 are used for transmission of data addressed to the mobile station 200. In this case, the size of the UE-specific search space of the mobile station 200 corresponds to the difference between the number of component carriers to be used and the number of component carries included in the monitoring set, which is "1".

On the other hand, in the example illustrated in the lower part, the component carriers to be used for transmission of control signals addressed to the mobile station 200 are changed to the component carriers #1. In this case, the size of the UE-specific search space of the mobile station 200 corresponds to the difference between the number of component carriers to be used and the number of component carries included in the monitoring set, which is "2". That is, the size of the UE-specific search space is increased compared to the case where the difference is "1". Thus, the area that might not overlap the common search space and other UE-specific search spaces is increased, and therefore the amount of the practically available radio resources may be increased.

According to the mobile communication system of the third embodiment described above, it is possible to specify a UE-specific search space with a size corresponding to the difference between the number of component carriers to be used for data communication and the number of component carriers to be used for transmission of control signals. That is, even if the monitoring set is variable, in the case where the amount of control signals to be transmitted in a single UE-specific search space is likely to be increased, the size of the UE-specific search space can be expanded. This makes it possible to balance between an increased search workload on the mobile stations 200 and 200a due to an increase of the search area and the ease of reservation of radio resources, and thus to effectively transmit the control signals.

It is to be noted that the method of adjusting the size of a UE-specific search space may be applied to a part of mobile stations, and the size of UE-specific search spaces of the other mobile stations may be fixed. Further, the method of the third embodiment may be used in combination with the method of the second embodiment. For example, the method of the third embodiment may be applied to only a part of component carriers or a part of mobile stations, and the method of the second embodiment may be applied to the other component carriers or mobile stations.

Fourth Embodiment

Next, a description will be given of a fourth embodiment. The following mainly describes the differences from the second and third embodiments, and a description of the same features as those of the second and third embodiments will be omitted. In a mobile communication system according to the fourth embodiment, the starting location of the UE-specific search space is adjustable in accordance with the usage of the component carriers #1 through #5.

The mobile communication system of the fourth embodiment may be implemented with the same system configuration as that of the second embodiment illustrated in FIG. 2. Also, a base station and a mobile station of the fourth embodiment may be implemented with the same block configurations as those of the second embodiment illustrated in FIGS. 7 and 8, respectively. However, the method used by the carrier aggregation control unit 110 for specifying the starting location and the method used by the space calculating unit 230 for calculating the starting location are different from those of the second embodiment. In the following, the fourth embodiment will be described using the same reference numbers as those used in FIGS. 7 and 8.

Figure 13:
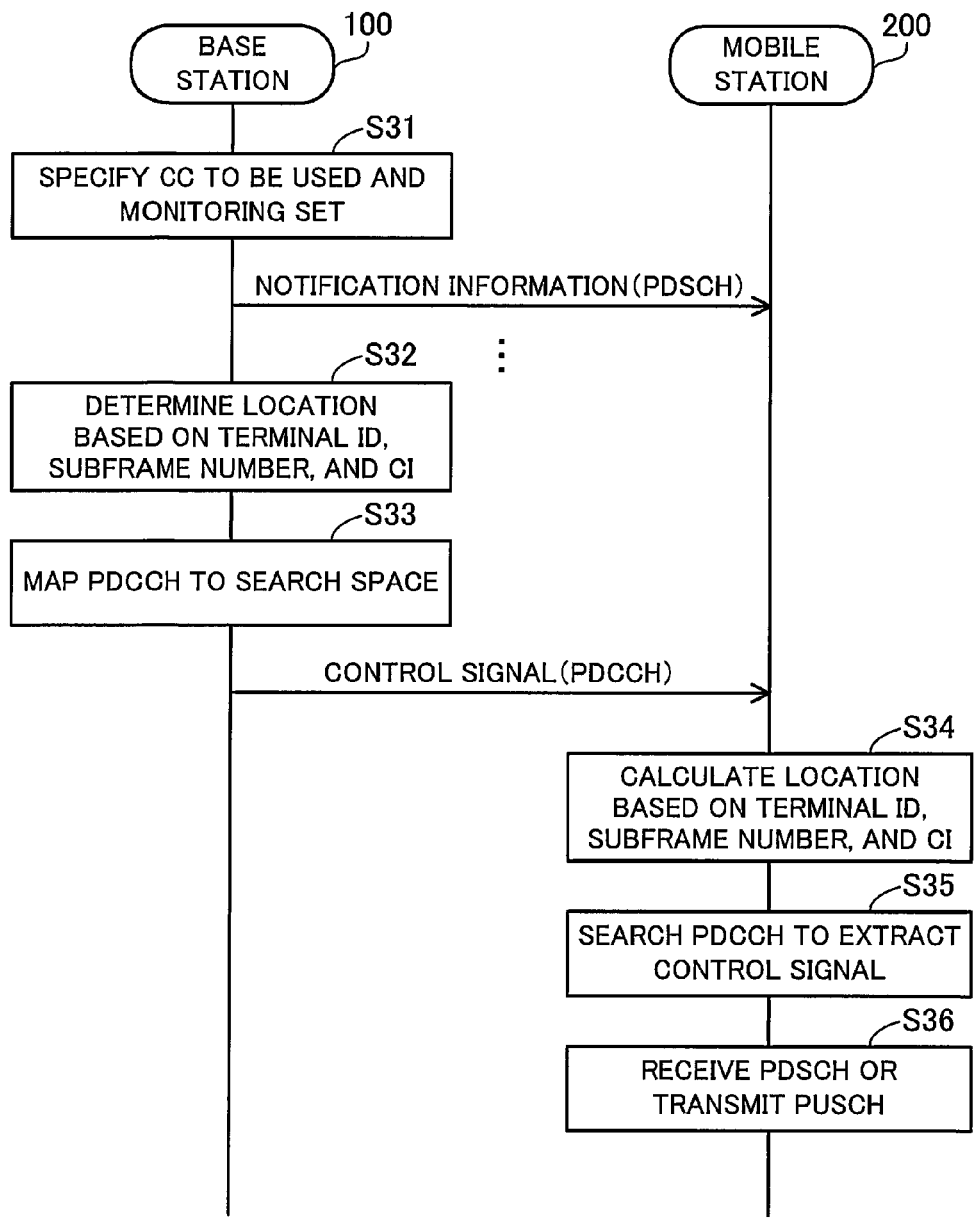
FIG. 13 is a flowchart illustrating transmission and reception of a PDCCH according to a fourth embodiment.

FIG. 13 is a flowchart illustrating transmission and reception of a PDCCH according to the fourth embodiment. The operations illustrated in FIG. 13 will be described in order of step number.

(Step S31) The base station 100 specifies component carriers that might be used for communication by the mobile station 200. In each downlink subframe, all or a part of the specified component carriers are used. Further, the base station 100 specifies a monitoring set of the mobile station 200. The base station 100 informs the mobile station 200 of the component carriers to be used and the monitoring set on the PDSCH.

(Step S32) The base station 100 determines the starting location of a UE-specific search space of the mobile station 200 on the basis of the identifier of the mobile station 200, the number of the subframe for transmitting a PDCCH signal, and the carrier indicator (CI) serving as the identifier of the carrier component, for each of the component carriers belonging to the monitoring set specified in Step S31.

That is, even if there are UE-specific search spaces of the same timing and of the same mobile station, the locations of the UE-specific search spaces are set to be different from component carrier to component carrier. For example, a method that determines the starting location by applying an offset corresponding to the carrier indicator to the location calculated on the basis of the identifier of the mobile station 200 and the subframe number may be used. It is to be noted that the size of the UE-specific search space is fixed.

(Step S33) The base station 100 specifies a radio resource area that is identified by a predetermined size and the starting location determined in Step S32 as a UE-specific search space of the mobile station 200, for each of the component carriers belonging to the monitoring set specified in Step S31. The base station 100 maps a PDCCH signal addressed to the mobile station 200 to the specified UE-specific search space and transmits the PDCCH signal.

(Step S34) The mobile station 200 calculates the starting location of the UE-specific search space of the mobile station 200 on the basis of the identifier of the mobile station 200, the number of the currently-receiving subframe, and the carrier indicator of the component carrier, for each of the component carriers belonging to the monitoring set. The calculation formula of the starting location is commonly specified in advance for the base station 100 and the mobile station 200.

(Step S35) The mobile station 200 extracts signals in the radio resource area that is identified by the predetermined size and the starting location calculated in Step S34, for each of the component carriers belonging to the monitoring set. Then, the mobile station 200 searches the PDCCH out of the extracted signals in the radio resource area so as to extract the control signal addressed to the mobile station 200.

(Step S36) The mobile station 200 performs reception processing of the PDSCH or transmission processing of the PUSCH using the control signal extracted in Step S35.

It is to be noted that, once the above Step S31 is performed, the step does not need to be performed again as long as no change is made to the component carriers that might be used by the mobile station 200 or to the monitoring set. However, the number of component carriers that are actually used in each subframe varies up to the value specified in Step S31. The Steps S32 through S36 are repeatedly performed while the base station 100 and the mobile station 200 communicate with each other.

Figure 14:
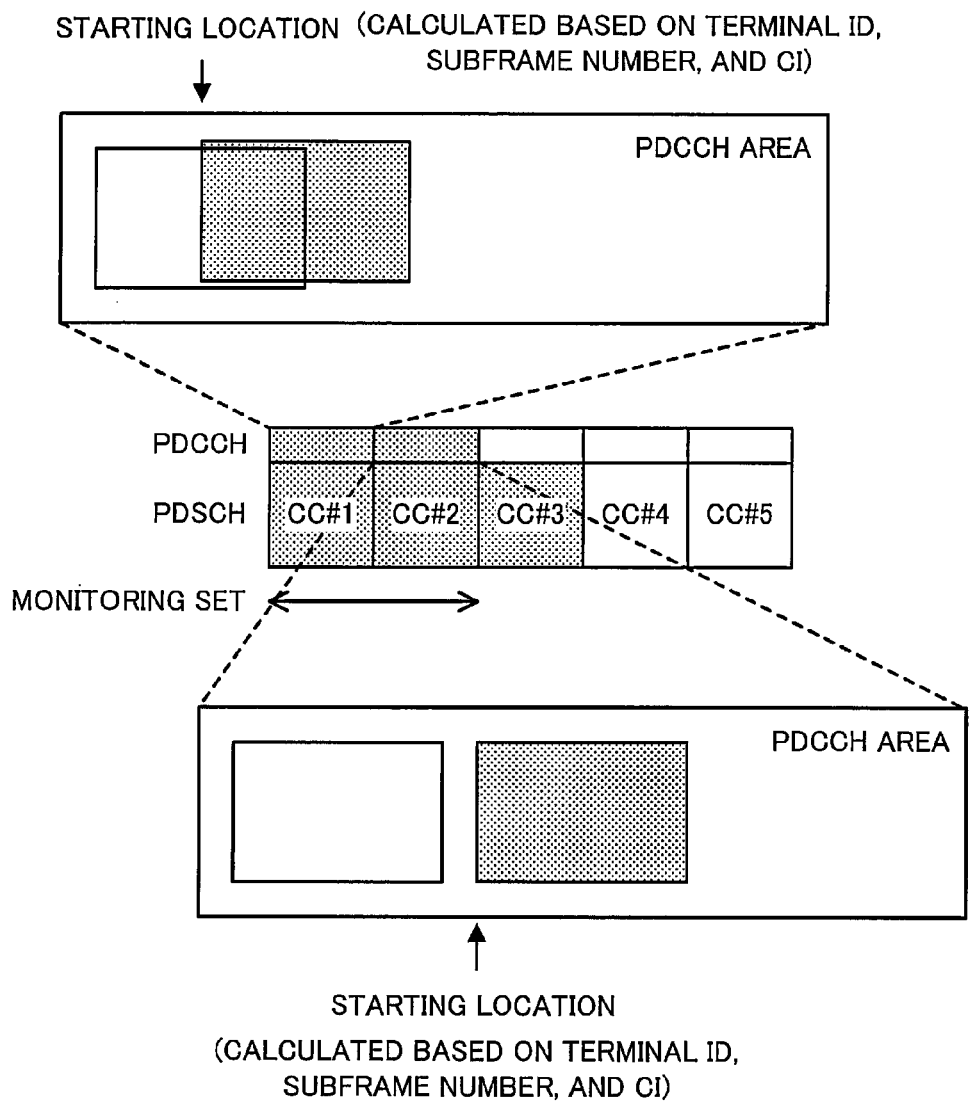
FIG. 14 illustrates an exemplary setting of a search space according to the fourth embodiment.

FIG. 14 illustrates an exemplary setting of a search space according to the fourth embodiment. In this example, the component carriers #1 and #2 are used for transmission of control signals addressed to the mobile station 200. The starting location of the UE-specific search space of each of the component carriers #1 and #2 corresponds to a combination of the identifier of the mobile station 200, the subframe number, and the carrier indicator of each of the component carriers #1 and #2.

That is, the starting locations of the UE-specific search spaces in the component carrier #1 and the component carrier #2 differ from each other. For example, the starting location in the component carrier #2 is shifted backward with respect to the starting location in the component carrier #1. Therefore, even if the overlapping area with the common search space and other UE-specific search spaces in one component carrier is large, the overlapping area in another component carrier may be reduced. Accordingly, the area that might not overlap the common search space and other UE-specific search spaces is increased, and therefore the amount of the practically available radio resources may be increased.

According to the mobile communication system of the fourth embodiment described above, it is possible to change the location of the UE-specific search space for each component carrier to be used for transmission of control signals. That is, the chance of reserving a sufficient amount of radio resources is increased in at least one component carrier. Accordingly, it is possible to transmit control signals effectively.

It is to be noted that, in the fourth embodiment, the starting location of the UE-specific search space is adjusted in accordance with the component carrier. However, in place of the starting location, the size may be adjusted in accordance with the component carrier. Alternatively, both the starting location and the size may be adjusted in accordance with the component carrier. Further, the above-described method of adjusting the starting location may be applied to only a part of mobile stations. Furthermore, the method of the fourth embodiment may be used in combination with the methods of the second and third embodiments.

Fifth Embodiment

Next, a description will be given of a fifth embodiment. The following mainly describes the differences from the second through fourth embodiments, and a description of the same features as those of the second through fourth embodiments will be omitted. A mobile communication system according to the fifth embodiment is different from that of the fourth embodiment in the method of determining the starting location of a UE-specific search space.

The mobile communication system of the fifth embodiment may be implemented with the same system configuration as that of the second embodiment illustrated in FIG. 2. Also, a base station and a mobile station of the fifth embodiment may be implemented with the same block configurations as those of the second embodiment illustrated in FIGS. 7 and 8, respectively. However, the method used by the carrier aggregation control unit 110 for specifying the starting location and the method used by the space calculating unit 230 for calculating the starting location are different from those of the second embodiment. In the following, the fifth embodiment will be described using the same reference numbers as those used in FIGS. 7 and 8.

Figure 15:
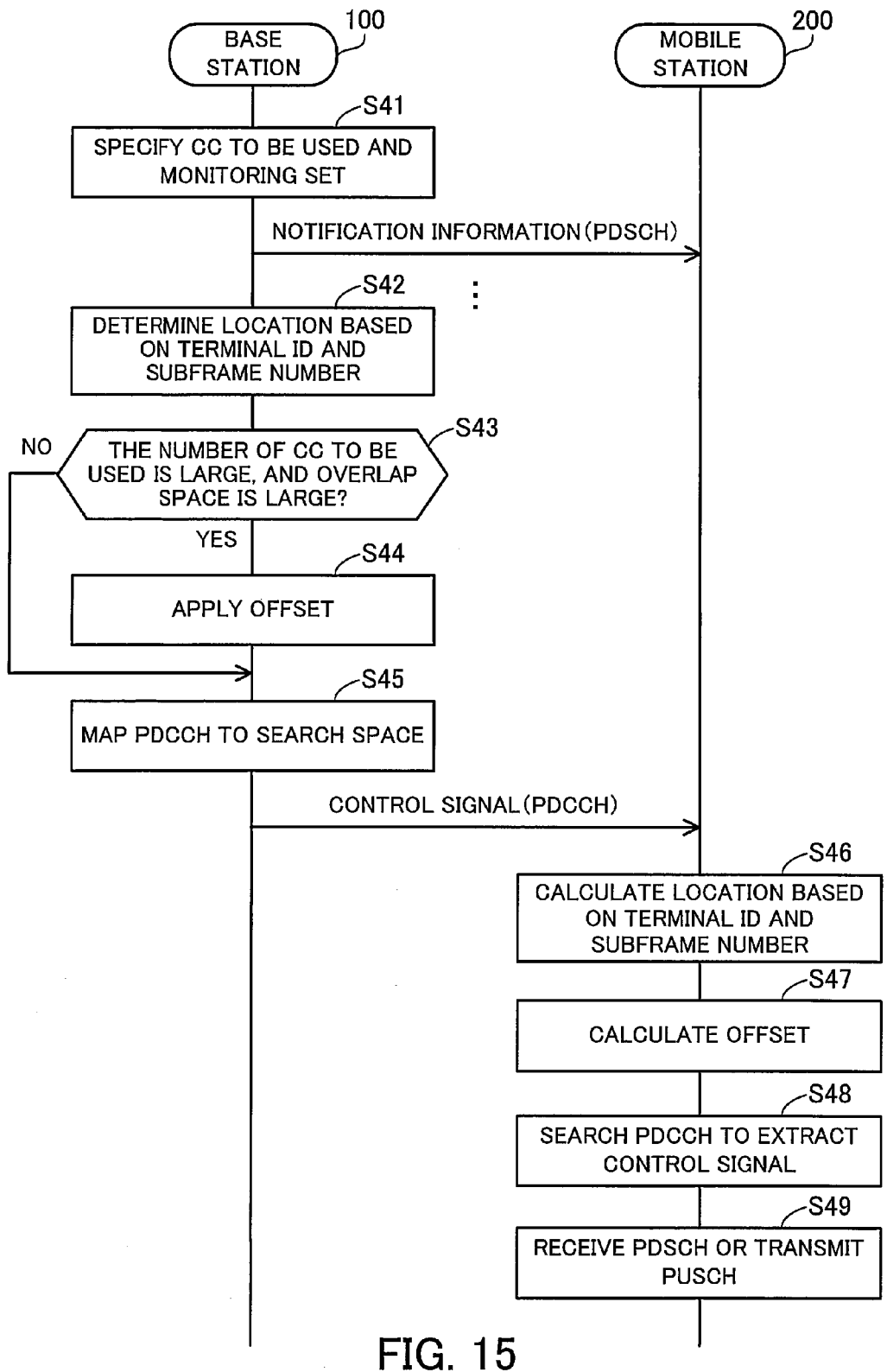
FIG. 15 is a flowchart illustrating transmission and reception of a PDCCH according to a fifth embodiment.

FIG. 15 is a flowchart illustrating transmission and reception of a PDCCH according to the fifth embodiment. The operations illustrated in FIG. 15 will be described in order of step number.

(Step S41) The base station 100 specifies component carriers that might be used for communication by the mobile station 200. In each downlink subframe, all or a part of the specified component carriers are used. Further, the base station 100 specifies a monitoring set of the mobile station 200. The base station 100 informs the mobile station 200 of the component carriers to be used and the monitoring set on the PDSCH.

(Step S42) The base station 100 calculates the starting location of a UE-specific search space of the mobile station 200 on the basis of the identifier of the mobile station 200 and the number of the subframe for transmitting a PDCCH signal. It is to be noted that the size of the UE-specific search space is fixed.

(Step S43) The base station 100 determines whether the number of component carriers to be used is large and whether the area of the overlap between the UE-specific search space with the starting location calculated in Step S42 and the common search space is large. If this condition is satisfied, the process proceeds to Step S44. If the condition is not satisfied, the process proceeds to Step S45.

The determination of whether the number of component carriers to be used is large may be made by determining whether the number of component carriers to be used is equal to or greater than a predetermined threshold (e.g., "3"). Alternatively, the determination may be made by determining whether the difference between the number of component carriers to be used and the number of component carriers included in the monitoring set is equal to or greater than a predetermined threshold (e.g., "2"). Further, the determination of whether the area of the overlap between the UE-specific search space and the common search space is large may be made by determining whether the distance between the starting location of the UE-specific search space and the starting location of the common search space is equal to or greater than a predetermined threshold.

(Step S44) The base station 100 applies an offset to the starting location calculated in Step S42 so as to correct the starting location. The offset amount may be a fixed amount such as the length of the common search space, for example. Alternatively, the offset may be adjusted in accordance with the number of component carriers to be used by the mobile station 200, or in accordance with the difference between the number of component carriers to be used and the number of component carriers included in the monitoring set.

(Step S45) The base station 100 specifies a radio resource area that is identified by a predetermined size and the determined starting location as a UE-specific search space of the mobile station 200, for each of the component carriers belonging to the monitoring set. The base station 100 maps a PDCCH signal addressed to the mobile station 200 to the specified UE-specific search space and transmits the PDCCH signal.

(Step S46) The mobile station 200 calculates the starting location of the UE-specific search space of the mobile station 200 on the basis of the identifier of the mobile station 200 and the number of a currently-receiving subframe.

(Step S47) The mobile station 200 determines whether the same condition as that of Step S43 is satisfied, on the basis of the number of component carriers to be used and the starting location calculated in Step S46. Then, if the condition is satisfied, an offset is applied to the calculated starting location so as to correct the starting location.

(Step S48) The mobile station 200 extracts signals in the radio resource area that is identified by the predetermined size and the starting location calculated in Step S47, for each of the component carriers belonging to the monitoring set. Then, the mobile station 200 searches the PDCCH out of the extracted signals in the radio resource area so as to extract the control signal addressed to the mobile station 200.

(Step S49) The mobile station 200 performs reception processing of the PDSCH or transmission processing of the PUSCH using the control signal extracted in Step S48.

Figure 16:
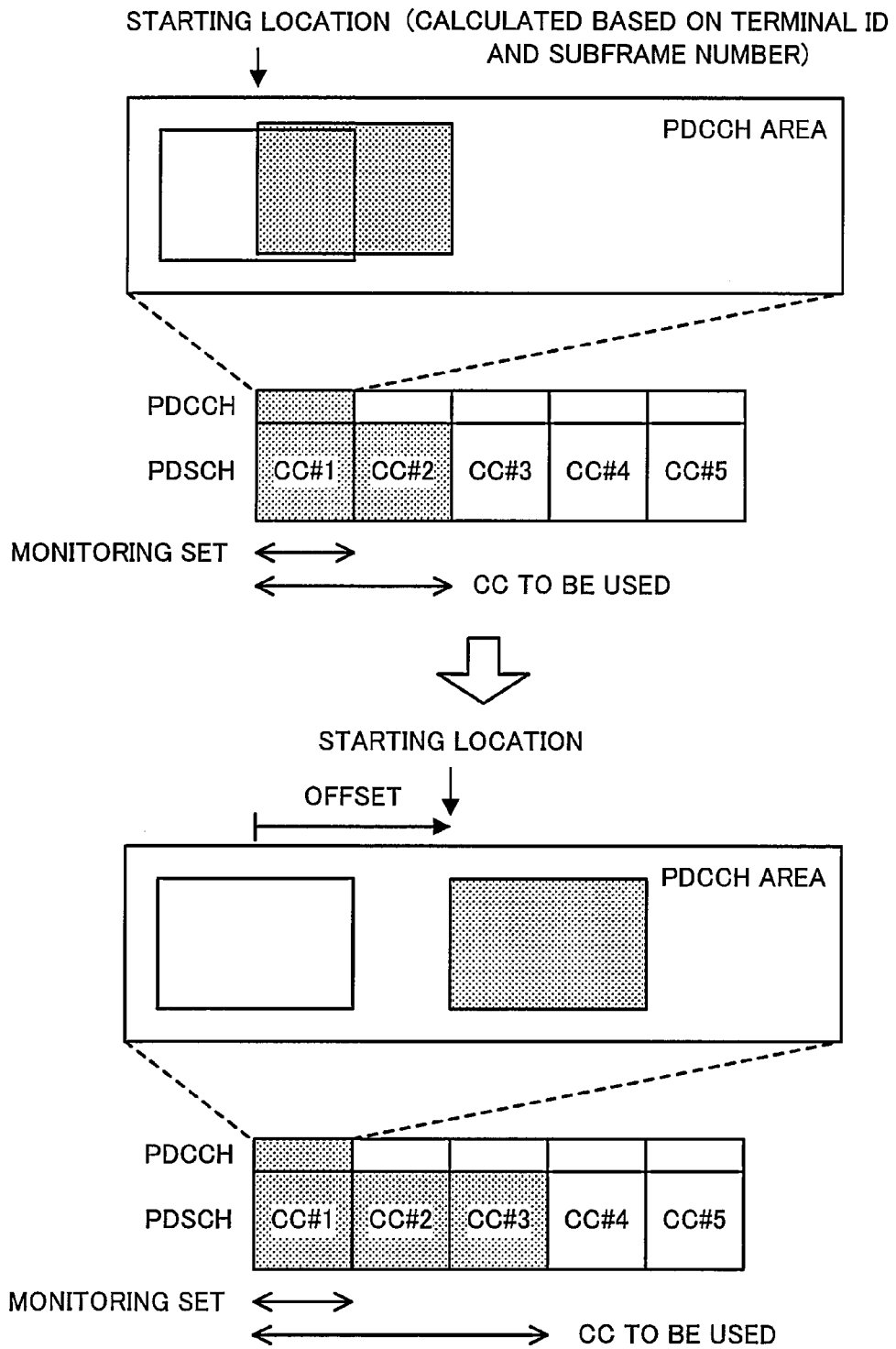
FIG. 16 illustrates an exemplary setting of a search space according to the fifth embodiment.

FIG. 16 illustrates an exemplary setting of a search space according to the fifth embodiment. In the example illustrated in the upper part of FIG. 16, the component carrier #1 is used for transmission of control signals addressed to the mobile station 200, and the component carriers #1 and #2 are used for transmission of data addressed to the mobile station 200. In this case, even if the UE-specific search space determined in accordance with the identifier of the mobile station 200 and the subframe number overlaps the common search space, no offset is applied.

On the other hand, in the example illustrated in the lower part, the component carriers to be used for transmission of data addressed to the mobile station 200 are expanded to the component carriers #1 through #3. In this case, if the UE-specific search space determined in accordance with the identifier of the mobile station 200 and the subframe number overlaps the common search space, the location of the UE-specific search space is shifted away from the common search space. That is, the area overlapping the common search space and the UE-specific search spaces of the mobile station 200 is reduced, and therefore the amount of the practically available radio resources may be increased.

According to the mobile communication system of the fifth embodiment described above, it is possible to correct the location of a UE-specific search space in accordance with the number of component carriers to be used for data communication and the size of the overlap with the common search space. That is, it is possible to reduce the area of the overlap with the common search space in the case where the amount of control signals to be transmitted in the UE-specific search space is likely to be increased and the amount of the practically available radio resources is likely to be reduced due to the overlap with the common search space. Accordingly, radio resources to be used for transmission of control signals are easily reserved, which allows effective transmission of the control signals.

In addition to the method of the fifth embodiment, the size of the UE-specific search space may be adjusted in accordance with the usage of the component carriers #1 through #5. Further, the above-described method of adjusting the starting location may be applied to only a part of mobile stations. Furthermore, the method of the fifth embodiment may be used in combination with the methods of the second through fourth embodiments.

According to the above-described radio communication system, radio communication apparatus, and radio communication method, in the case where communication is performed using a plurality of frequency bands, resources to be used for transmission of control signals are easily reserved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio communication system comprising:
a first radio communication apparatus and a second radio communication apparatus that communicate by radio with each other using a plurality of component carriers; wherein:
the first radio communication apparatus includes a control unit configured to specify a radio resource area in which the second radio communication apparatus searches for a control signal based on a subframe number associated with the control signal transmitted by the first radio communication apparatus, an identifier assigned to the second radio communication apparatus and information about the plurality of component carriers, and
a transmitting unit configured to transmit the control signal addressed to the second radio communication apparatus, in the radio resource area specified by the control unit; and wherein
the second radio communication apparatus includes a calculating unit configured to calculate the specified radio resource area, based on the subframe number associated with the control signal transmitted by the first radio communication apparatus, the identifier assigned to the second radio communication apparatus and the information about the plurality of component carriers, and a detecting unit configured to search signals in the radio resource area calculated by the calculating unit, out of signals received from the first radio communication apparatus, so as to detect the control signal addressed to the second radio communication apparatus, wherein the radio resource area in which the second radio communication apparatus searches for the control signal is determined by inputting numerical values including: a component carrier number and the identifier assigned to the second radio communication apparatus into a predetermined function.

2. The radio communication system according to claim 1, wherein the information about the plurality of component carriers includes a number of component carriers to be used for data communication by the second radio communication apparatus.

3. The radio communication system according to claim 2, wherein the control unit determines a size of the radio resource area based on the number of component carriers to be used for the data communication.

4. The radio communication system according to claim 2, wherein the control unit determines a size of the radio resource area based on a difference between the number of component carriers to be used for the data communication and the number of component carriers to be used for transmission of the control signal addressed to the second radio communication apparatus.

5. The radio communication system according to claim 2, wherein the control unit determines a location of the radio resource area based on the number of component carriers to be used for the data communication.

6. The radio communication system according to claim 1, wherein the control unit specifies another radio resource area to be commonly searched by a plurality of radio communication apparatuses including the second radio communication apparatus and determines a location of the radio resource area based on a location of the specified other radio resource area in addition to the information about use of the plurality of component carriers.

7. The radio communication system according to claim 1, wherein the control unit changes a location of the radio resource area in accordance with the component carrier to which the radio resource area is set.

8. The radio communication system according to claim 1, wherein information indicating a component carrier to which the radio resource area is set is included in a control signal transmitted in the radio resource area.

9. The radio communication system according to claim 1, wherein the radio resource area includes at least one of a location and a size and of the radio resource area in which the second radio communication apparatus searches for the control signal.

10. The radio communication system according to claim 1, wherein the subframe number is provided by a slot number.

11. A radio communication apparatus that communicates by radio with another radio communication apparatus using a plurality of component carriers, the radio communication apparatus comprising:

a control unit configured to specify a radio resource area in which said another radio communication apparatus searches for a control signal based on a subframe number associated with the control signal transmitted by the radio communication apparatus, an identifier assigned to said another radio communication apparatus and information about the plurality of component carriers; and a transmitting unit configured to transmit the control signal addressed to said another radio communication apparatus, in the radio resource area specified by the control unit, to allow said another radio communication apparatus to detect the control signal addressed to said another radio communication apparatus in the radio resource area based on the subframe number associated with the control signal transmitted by the radio communication apparatus, the identifier assigned to said another radio communication apparatus and the information about the plurality of component carriers, wherein the radio resource area in which said another radio communication apparatus searches for the control signal is determined by inputting numerical values including: a component carrier number and the identifier assigned to said another radio communication apparatus into a predetermined function.

12. The radio communication apparatus of claim 11, wherein the subframe number is provided by a slot number.

13. The radio communication apparatus according to claim 11, wherein the radio resource area includes at least one of a location and a size and of the radio resource area in which said another radio communication apparatus searches for the control signal.

14. A radio communication apparatus that communicates by radio with another radio communication apparatus using a plurality of component carriers, the radio communication apparatus comprising:

a calculating unit configured to calculate a radio resource area to be used for transmission of a control signal addressed to the radio communication apparatus based on a subframe number associated with the control signal transmitted by said another radio communication apparatus, an identifier assigned to the radio communication apparatus and information about the plurality of component carriers; and a detecting unit configured to search signals in the radio resource area calculated by the calculating unit, out of signals received from said another radio communication apparatus, so as to detect the control signal addressed to the radio communication apparatus from said another communication apparatus in the radio resource area based on the subframe number associated with the control signal transmitted by said another communication apparatus, the identifier assigned to the radio communication apparatus and information about the plurality of component carriers, wherein the radio resource area in which said another radio communication apparatus searches for the control signal is determined by inputting numerical values including: a component carrier number, and the identifier assigned to said another radio communication apparatus into a predetermined function.

15. The radio communication apparatus of claim 14, wherein the subframe number is provided by a slot number.

16. The radio communication apparatus according to claim 14, wherein the radio resource area includes at least one of a location and a size and of the radio resource area in which the radio communication apparatus searches for the control signal.

17. A radio communication method that causes a first radio communication apparatus and a second radio communication apparatus to communicate by radio with each other using a plurality of component carriers, the method comprising:

specifying, by the first radio communication apparatus, a radio resource area in which the second radio communication apparatus searches for a control signal based on a subframe number associated with the control signal transmitted by the first radio communication apparatus, an identifier assigned to the second radio communication apparatus and information about the plurality of component carriers;

transmitting, by the first radio communication apparatus, the control signal addressed to the second radio communication apparatus, in the specified radio resource area;

calculating, by the second radio communication apparatus, the specified radio resource area based on the subframe number associated with the control signal transmitted by the first radio communication apparatus, the identifier assigned to the second radio communication apparatus and information about the plurality of component carriers; and searching, by the second radio communication apparatus, signals in the calculated radio resource area, out of signals received from the first radio communication apparatus, so as to detect the control signal addressed to the second radio communication apparatus, wherein the radio resource area in which the second radio communication apparatus searches for the control signal is determined by inputting numerical values including: a component carrier number, and the identifier assigned to the second radio communication apparatus into a predetermined function.

18. The radio communication method of claim 17, wherein the subframe number is provided by a slot number.

19. The radio communication method according to claim 17, wherein the radio resource area includes at least one of a location and a size and of the radio resource area in which the second radio communication apparatus searches for the control signal.

* * * * *